United States Patent
Mita et al.

(10) Patent No.: US 12,480,954 B2
(45) Date of Patent: Nov. 25, 2025

(54) METHOD FOR ASSISTING EVALUATION OF CONDITION OF KIDNEYS, SYSTEM FOR EVALUATING CONDITION OF KIDNEYS, AND PROGRAM FOR EVALUATING CONDITION OF KIDNEYS

(71) Applicant: Kagami Inc., Ibaraki (JP)

(72) Inventors: Masashi Mita, Tokyo (JP); Tatsuhiko Ikeda, Tokyo (JP); Tomonori Kimura, Osaka (JP)

(73) Assignees: Kagami Inc., Osaka (JP); National Institutes of Biomedical Innovation, Health and Nutrition, Osaka (JP)

( * ) Notice: Subject to any disclaimer, the term of this patent is extended or adjusted under 35 U.S.C. 154(b) by 1100 days.

(21) Appl. No.: 17/441,638

(22) PCT Filed: Mar. 23, 2020

(86) PCT No.: PCT/JP2020/012806
§ 371 (c)(1),
(2) Date: Apr. 22, 2022

(87) PCT Pub. No.: WO2020/196436
PCT Pub. Date: Oct. 1, 2020

(65) Prior Publication Data
US 2022/0252610 A1    Aug. 11, 2022

(30) Foreign Application Priority Data
Mar. 22, 2019 (JP) .............................. JP2019-055743
Mar. 25, 2019 (JP) .............................. JP2019-057326

(51) Int. Cl.
*G01N 33/68*     (2006.01)
*G01N 30/88*     (2006.01)

(52) U.S. Cl.
CPC ..... *G01N 33/6812* (2013.01); *G01N 33/6893* (2013.01); *G01N 2030/8877* (2013.01); *G01N 2800/347* (2013.01); *G01N 2800/52* (2013.01)

(58) Field of Classification Search
CPC ..... G01N 2030/8877; G01N 2800/347; G01N 2800/52; G01N 33/6812; G01N 33/6893
See application file for complete search history.

(56) References Cited

U.S. PATENT DOCUMENTS

2013/0323751 A1   12/2013   Singbartl et al.
2015/0079623 A1   3/2015   Hamase et al.
(Continued)

FOREIGN PATENT DOCUMENTS

JP          5740523 B1    5/2015
JP    2017-207489 A    11/2017
(Continued)

OTHER PUBLICATIONS

Fukushima et al., "Determination of D-Amino Acids in Serum from Patients with Renal Dysfunction," Biol. Pharm. Bull., 1995, 18(8):1130-1132.
(Continued)

*Primary Examiner* — Jennifer Wecker
(74) *Attorney, Agent, or Firm* — Foley & Lardner LLP

(57) ABSTRACT

The present invention provides a method for assisting in the evaluation of the condition of kidneys, a system for evaluating the condition of kidneys, and a program for evaluating the condition of kidneys, using, as an index, the ratio of reabsorption of D-serine and/or D-asparagine in target kidneys and excretion of the D-serine and/or D-asparagine. The present invention also provides a method for monitoring the condition of kidneys and a method for monitoring the effect of treatment on kidney disease.

20 Claims, 13 Drawing Sheets

(56) References Cited

U.S. PATENT DOCUMENTS

2016/0313342 A1* 10/2016 Hamase .............. G01N 33/6812
2019/0271708 A1   9/2019 Isaka et al.
2019/0317106 A1* 10/2019 Isaka .................. G01N 33/6812

FOREIGN PATENT DOCUMENTS

JP       2017-207490 A      11/2017
WO    WO-2013/140785 A1    9/2013

OTHER PUBLICATIONS

Hesaka et al., "D-Serine reflects kidney function and diseases," Scientific Reports, Mar. 25, 2019, 9:5104, 1-8.

Hesaka et al., "Dynamics of D-serine reflected the recovery course of a patient with rapidly progressive glomerulonephritis," CEN Case Reports, Jul. 29, 2019, 8:297-300.

Huang et al., "Urinary Excretion of D-Serine in Human: Comparison of Different Ages and Species," Biol. Pharm. Bull., 1998, 21(2):156-162.

Ishida, Hironori, "Serum D-Amino Acid Elucidated in Renal Failure," Kitasato Medical Journal, 1993, 23:51-62, with English abstract.

Iwakawa et al., "Urinary D-serine level as a predictive biomarker for deterioration of renal function in patients with atherosclerotic risk factors," Biomarkers, 2019, 24(2):159-165.

Kimura et al., "D-Amino acids and kidney diseases," Clinical and Experimental Nephrology, 2020, 24:404-410.

Koeppen et al., Renal Physiology, Fifth Edition, 2013, Chapter 3: "Glomerular Filtration and Renal Blood Flow," 27-43, with table of contents.

Nagata et al., "Free D-amino Acid Level in Human Plasma and Degree of Kidney Disfunction," Journal of Clinical and Experimental Medicine (Igaku No Ayumi), Aug. 15, 1987, 142(6/7):401-402, with English translation.

Nagata et al., "Free D-amino acids in human plasma in relation to senescence and renal diseases," Clinical Sciences, 1987, 73:105-108.

Nagata, Yoko, "Neutral free D-amino acids present in human plasma," Viva Origino, Jul. 1990, 18(2):88-89, 15th Lecture Meeting Abstracts, with partial English translation.

Kimura et al., "Chiral amino acid metabolomics for novel biomarker screening in the prognosis of chronic kidney disease," Scientific Reports, May 18, 2016, 6(1):26137, 1-7.

Sasabe et al., "Ischemic Acute Kidney Injury Perturbs Homeostasis of Serine Enantiomers in the Body Fluid in Mice: Early Detection of Renal Dysfunction Using the Ratio of Serine Enantiomers," PLOS ONE, Jan. 29, 2014, 9(1):e86504, 1-9.

* cited by examiner

FIG. 1

| Non-kidney disease | Blood D-Ser (nmol/mL) | Urine D-Ser (nmol/mL) | Blood D-Asn (nmol/mL) | Urine D-Asn (nmol/mL) | Blood Creatinine (mg/dL) | Urine Creatinine (mg/dL) | Fe_D-Ser (%) | LN Fe_D-Ser | Fe_D-Asn (%) | LN Fe_D-Asn |
|---|---|---|---|---|---|---|---|---|---|---|
| Sample1 | 1.859 | 26.888 | 0.171 | 2.473 | 0.97 | 24.39 | 57.515 | 4.052 | 57.518 | 4.052 |
| Sample2 | 2.023 | 12.611 | 0.155 | 1.212 | 0.76 | 8.31 | 57.018 | 4.043 | 71.493 | 4.270 |
| Sample3 | 2.306 | 16.849 | 0.198 | 1.732 | 0.91 | 13.65 | 48.706 | 3.886 | 58.322 | 4.066 |
| Sample4 | 1.563 | 17.621 | 0.142 | 1.820 | 0.76 | 13.8 | 62.086 | 4.129 | 70.568 | 4.257 |
| Sample5 | 1.388 | 34.128 | 0.18 | 3.783 | 0.9 | 28.63 | 77.311 | 4.348 | 66.063 | 4.191 |
| Sample6 | 1.877 | 87.867 | 0.132 | 7.388 | 0.79 | 76.62 | 48.267 | 3.877 | 57.706 | 4.055 |
| Sample7 | 1.849 | 12.664 | 0.0711 | 0.607 | 0.52 | 6.95 | 51.253 | 3.937 | 63.916 | 4.158 |
| Sample8 | 1.58 | 21.647 | 0.116 | 1.783 | 0.69 | 20.2 | 46.808 | 3.846 | 52.494 | 3.961 |
| Sample9 | 1.384 | 18.353 | 0.115 | 1.422 | 0.5 | 9.38 | 70.692 | 4.258 | 65.931 | 4.189 |
| Sample10 | 1.991 | 28.757 | 0.18 | 3.226 | 0.86 | 22.37 | 55.54 | 4.017 | 68.896 | 4.233 |
| Sample11 | 0.928 | 12.573 | 0.163 | 1.988 | 0.7 | 14.72 | 64.453 | 4.166 | 58.005 | 4.061 |
| Sample12 | 1.147 | 14.697 | 0.146 | 1.665 | 0.65 | 10.88 | 76.523 | 4.338 | 68.125 | 4.221 |
| Sample13 | 1.133 | 14.836 | 0.158 | 1.917 | 0.7 | 11.97 | 76.603 | 4.339 | 70.965 | 4.262 |
| Sample14 | 1.155 | 145.078 | 0.143 | 15.728 | 0.76 | 147.02 | 64.941 | 4.173 | 56.857 | 4.041 |
| Sample15 | 0.958 | 17.181 | 0.125 | 2.008 | 0.89 | 19.09 | 83.641 | 4.427 | 74.896 | 4.316 |

FIG. 2

| Kidney disease | Blood D-Ser (nmol/mL) | Urine D-Ser (nmol/mL) | Blood D-Asn (nmol/mL) | Urine D-Asn (nmol/mL) | Blood Creatinine (mg/dL) | Urine Creatinine (mg/dL) | Fe_D-Ser (%) | LN Fe_D-Ser | Fe_D-Asn (%) | LN Fe_D-Asn |
|---|---|---|---|---|---|---|---|---|---|---|
| IGAN, ARB | 1.8 | 19.53 | 0.201 | 3 | 0.83 | 35 | 25.73 | 3.248 | 35.394 | 3.567 |
| PA | 2.39 | 226.13 | 0.184 | 22.39 | 1.14 | 92 | 117.24 | 4.764 | 150.78 | 5.016 |
| IGAN | 1.25 | 61.07 | 0.135 | 4.67 | 0.74 | 56 | 64.56 | 4.168 | 45.712 | 3.822 |
| DM | 8.22 | 22.36 | 1.29 | 4.43 | 3.6 | 23 | 42.577 | 3.751 | 53.751 | 3.984 |
| MGRS | 8.07 | 43.86 | 1.1 | 5.88 | 5.71 | 29 | 107.012 | 4.673 | 105.25 | 4.656 |

# METHOD FOR ASSISTING EVALUATION OF CONDITION OF KIDNEYS, SYSTEM FOR EVALUATING CONDITION OF KIDNEYS, AND PROGRAM FOR EVALUATING CONDITION OF KIDNEYS

CROSS-REFERENCE TO RELATED APPLICATIONS

This application is the U.S. National Stage of PCT/JP2020/012806, filed Mar. 23, 2020, which claims priority to JP 2019-055743, filed Mar. 22, 2019 and JP 2019-057326, filed Mar. 25, 2019.

FIELD

The present invention relates to a method for assisting evaluation of kidney condition, to a system for evaluating kidney condition and to a program for evaluating kidney condition.

BACKGROUND

The kidneys are important organs for maintaining homeostasis in biological environments by excretion and absorption of body components, and they also perform the important functions of forming blood and bone, in addition to discharging waste products, regulating blood pressure and regulating body fluids and ions. Glomerular filtration rate (GFR) is a typical marker for indication of renal function. The glomerular filtration rate represents the liquid volume filtered per minute from blood by the glomeruli, with inulin clearance considered to be the international gold standard. However, measurement of inulin clearance requires continuous drip infusion of inulin over a period of 2 hours as well as urine and blood collection multiple times, which creates a burden for both the patient and the practitioner. For routine practice in the clinic, therefore, measurement of inulin clearance is only carried out for limited situations such as donors for live kidney transplant, otherwise being substituted by measurement of other markers such as creatinine. Inulin clearance is also poorly applicable in cases where changes in kidney condition during a short period of time, such as in acute kidney injury. Most marker values, however, diverge significantly from the actual glomerular filtration rate according to the gold standard of inulin clearance, thus interfering with accurate diagnosis of kidney disease.

Creatinine is routinely measured in the clinic as a marker for renal function. Creatinine is the final metabolite of creatine which is necessary for muscle contraction. Creatine formed in the liver is taken up into muscle cells and partially metabolized to creatinine, transported to the kidneys through the blood, filtered by the glomeruli, and then excreted into urine in the renal tubules without being reabsorbed. It is utilized for evaluation of renal function because it can serve as an advantageous marker for uremia, since reduced glomerular filtration capacity leads to impaired discharge and accumulation in the blood causing its numerical value to increase. However, the amount of creatinine in blood does not appear as a clearly abnormal value until GFR has reduced by 50% or greater, and it therefore cannot be considered to be a sensitive marker.

Cystatin C is a protein of 13.36 kDa molecular weight that is produced in a fixed proportion by systemic nucleated cells, and is completely filtered out by the glomeruli and subsequently decomposed in the kidneys via reabsorption in the renal tubules, and since it is therefore thought to be removed from the blood depending on the filtration rate, its amount in blood serves as a GFR marker. When renal function is greatly reduced, however, the amount of increase in blood cystatin C reaches a plateau, and in end-stage kidney disease it becomes difficult to accurately evaluate renal function.

Thus, no biomarker has yet existed that can adequately meet clinical demands for accurately measuring kidney condition for individual patients in a wide range from early to late stage using only a sample or blood obtainable in a noninvasive manner, without a large burden on subjects or patients.

Conventionally, D-amino acids had been considered to be absent from mammalian bodies but have since been shown to be present in various tissues and to carry out physiological functions. It has been shown that the amounts of D-serine, D-alanine, D-proline, D-glutamic acid and D-aspartic acid in blood can serve as kidney failure markers since they vary in kidney failure patients and correlate with creatinine (NPL 1, NPL 2, NPL 3, NPL 4). It has also been disclosed that amino acids selected from the group consisting of D-serine, D-threonine, D-alanine, D-asparagine, D-allothreonine, D-glutamine, D-proline and D-phenylalanine serve as pathology marker values for kidney disease (PTL 1). It has also been disclosed that D-serine, D-histidine, D-asparagine, D-arginine, D-allothreonine, D-glutamic acid, D-alanine, D-proline, D-valine, D-alloisoleucine, D-phenylalanine and D-lysine in urine undergo sensitive fluctuation depending on nephropathy, and that parameters based on these amino acids can be used as marker values for pathology in kidney disease (PTL 2). Incidentally, while urine L-FABP, blood NGAL and urine KIM-1 have been disclosed as kidney disease markers in recent years, these are not associated with glomerular filtration capacity.

CITATION LIST

Patent Literature

[PTL 1] International Patent Publication No. 2013/140785
[PTL 2] Japanese Patent Publication No. 5740523

Non Patent Literature

[NPL 1] Fukushima, T. et al., Biol. Pharm. Bull. 18: 1130 (1995)
[NPL 2] Nagata Y. Viva Origino Vol. 18 (No. 2) (1990), 15th Lecture Meeting Abstracts
[NPL 3] Ishida et al., Kitasato Medical Journal 23:51-62 (1993)
[NPL 4] Yong Huang et al., Biol. Pharm. Bull. 21:(2)156-162 (1998)

SUMMARY

Technical Problem

It is desired to provide a method for accurate evaluation and assessment of kidney condition of patients across a wider range than the currently known kidney disease markers.

Solution to Problem

The present inventors focused on the dynamics of filtration, reabsorption and excretion of D-serine and D-asparagine in the kidneys, and upon analyzing the relationship between their excretion rate and kidney condition, it was found that this provides new pathological information for evaluation and assessment of kidney condition, and the present invention was completed.

The present invention thus relates to the following:

[1] A method for assisting evaluation of kidney condition, using the rate of reabsorption and excretion of D-serine and/or D-asparagine in the kidneys of a subject as a marker.

[2] The method according to [1] above, wherein the rate is the excretion rate of D-serine into urine of the subject (subject D-serine excretion rate) and/or the excretion rate of D-asparagine into urine of the subject (subject D-asparagine excretion rate).

[3] The method according to [2] above, wherein the excretion rate of D-serine and/or the excretion rate of D-asparagine is calculated with correction using a correction factor from blood and/or urine.

[4] The method according to [3] above, wherein the correction factor is one or more correction factors selected from the group consisting of glomerular filtration rate and urinary volume.

[5] The method according to [3] above, wherein the correction factor is one or more correction factors selected from the group consisting of inulin clearance and creatinine clearance.

[6] The method according to [3] above, wherein the correction factor is one or more correction factors selected from the group consisting of creatinine level and L-amino acid level.

[7] The method according to [3] above, wherein the correction factor is L-serine and/or L-asparagine.

[8] The method according to [2] or [3] above, wherein: the excretion rate of D-serine is calculated by the following formula:

D-serine excretion rate(Fe_D-Ser) = [Mathematical Formula 1]
$$\frac{U_{D-Ser}/P_{D-Ser}}{U_{Cre}/P_{Cre}}$$

[where
$U_{D-Ser}$ represents the level of D-serine in the urine,
$P_{D-Ser}$ represents the level of D-serine in the blood,
$U_{Cre}$ represents the level of creatinine in the urine, and
$P_{Cre}$ represents the level of creatinine in the blood], and/or the excretion rate of D-asparagine is calculated by the following formula:

D-asparagine excretion rate(Fe_D-Asn) = [Mathematical Formula 2]
$$\frac{U_{D-Asn}/P_{D-Asn}}{U_{Cre}/P_{Cre}}$$

[where
$U_{D-Asn}$ represents the level of D-asparagine in the urine,
$P_{D-Asn}$ represents the level of D-asparagine in the blood,
$U_{Cre}$ represents the level of creatinine in the urine, and
$P_{Cre}$ represents the level of creatinine in the blood].

[9] The method according to any one of [2] to [8] above, comprising:
comparing the subject D-serine excretion rate and/or the subject D-asparagine excretion rate with a first reference calculated from the excretion rates of D-serine into urine of multiple non-kidney disease subjects (non-kidney disease subject D-serine excretion rate) and/or the excretion rate of D-asparagine into urine of multiple non-kidney disease subjects (non-kidney disease subject D-asparagine excretion rate), and
evaluating kidney condition based on the relationship between the subject D-serine excretion rate and/or the subject D-asparagine excretion rate, and the first reference.

[10] The method according to [9] above, wherein the evaluating kidney condition is evaluating kidney disease or morbidity risk of the subject or predicting occurrence or prognosis of kidney disease, when the subject D-serine excretion rate and/or the subject D-asparagine excretion rate are not within the range of the first reference.

[11] The method according to [10] above, wherein the kidney disease is caused by chronic kidney disease, myeloma kidney, diabetic nephropathy, IgA nephropathy, interstitial nephritis or polycystic kidney, or systemic lupus erythematosus, primary aldosteronism, prostatic hypertrophy, Fabry disease or microvariant nephrotic syndrome.

[12] The method according to any one of [9] to [11] above, wherein the first reference is in the range of mean±SD×coefficient Z of the non-kidney disease subject D-serine excretion rate and/or non-kidney disease subject D-asparagine excretion rate.

[13] The method according to [12] above, wherein the coefficient Z is a value of 1.0 to 3.0.

[14] The method according to [12] or [13] above, wherein the coefficient Z is 1.96.

[15] The method according to any one of [9] to [14] above, wherein the first reference is in the range of 0.4 to 0.9.

[16] The method according to any one of [2] to [8] above, comprising:
comparing the logarithmic converted subject D-serine excretion rate (subject D-serine LN excretion rate) and/or the logarithmic converted subject D-asparagine excretion rate (subject D-asparagineLN excretion rate) with
a second reference calculated from the logarithmic converted values of the excretion rates of D-serine into urine of multiple non-kidney disease subjects (non-kidney disease subject D-serine LN excretion rates) and/or the logarithmic converted values of the excretion rate of D-asparagine into urine of multiple non-kidney disease subjects (non-kidney disease subject D-asparagineLN excretion rates), and
evaluating kidney condition based on the relationship between the subject D-serine LN excretion rate and/or the subject D-asparagine LN excretion rate, and the second reference.

[17] The method according to [16] above, wherein the evaluating kidney condition is evaluating kidney disease or morbidity risk of the subject or predicting occurrence or prognosis of kidney disease, when the subject D-serine LN excretion rate and/or the subject D-asparagine LN excretion rate are not within the range of the second reference.

[18] The method according to [17] above, wherein the kidney disease is caused by chronic kidney disease, myeloma kidney, diabetic nephropathy, IgA nephropathy, interstitial nephritis or polycystic kidney, or systemic lupus erythematosus, primary aldosteronism, prostatic hypertrophy, Fabry disease or microvariant nephrotic syndrome.

[19] The method according to any one of [16] to [18] above, wherein the second reference is in the range of mean±SD× coefficient Z of the non-kidney disease subject D-serineLN excretion rate and/or non-kidney disease subject D-asparagineLN excretion rate.

[20] The method according to [19] above, wherein the coefficient Z is a value of 1.0 to 3.0.

[21] The method according to [19] or [20] above, wherein the coefficient Z is 1.96.

[22] The method according to any one of [16] to [21] above, wherein the second reference is in the range of 3.5 to 5.0.

[23] A method of monitoring kidney condition, wherein the excretion rate of D-serine into the urine of a subject (subject D-serine excretion rate) and/or the D-asparagine excretion rate in the urine of a subject (subject D-asparagine excretion rate) is periodically measured and the fluctuation is used as a marker.

[24] The method according to [23] above, which monitors kidney condition based on kidney disease caused by chronic kidney disease, myeloma kidney, diabetic nephropathy, IgA nephropathy, interstitial nephritis or polycystic kidney, or systemic lupus erythematosus, primary aldosteronism, prostatic hypertrophy, Fabry disease or microvariant nephrotic syndrome.

[25] A method of monitoring a therapeutic effect on kidney disease, wherein the excretion rate of D-serine into urine of a subject with kidney disease (subject D-serine excretion rate) and/or the excretion rate of D-asparagine into urine of a subject with kidney disease (subject D-asparagine excretion rate) is periodically measured before and after therapeutic intervention, and the fluctuation is used as a marker.

[26] The method according to [25] above, wherein the kidney disease is caused by chronic kidney disease, myeloma kidney, diabetic nephropathy, IgA nephropathy, interstitial nephritis or polycystic kidney, or systemic lupus erythematosus, primary aldosteronism, prostatic hypertrophy, Fabry disease or microvariant nephrotic syndrome.

[27] A system for evaluating kidney condition that comprises a storage unit, an input unit, an analytical measurement unit, a data processing unit and an output unit, wherein:

the storage unit stores a threshold value inputted from the input unit, and a calculation formula for D-serine excretion rate into urine and/or a calculation formula for D-asparagine excretion rate into urine, the analytical measurement unit quantifies the D-serine level and/or the D-asparagine level in a blood sample and/or urine sample, the data processing unit calculates the D-serine excretion rate and/or D-asparagine excretion rate in urine generated from an element containing the quantified D-serine level and/or D-asparagine level in a blood sample and/or urine sample, and the calculation formula for the D-serine excretion rate and/or the calculation formula for the D-asparagine excretion rate stored in the storage unit, the data processing unit evaluates kidney condition based on the threshold value stored in the storage unit and the D-serine excretion rate and/or D-asparagine excretion rate in the urine, and the output unit outputs the evaluation results for kidney condition of the subject.

[28] The evaluation system according to [27] above, wherein:

the calculation formula for D-serine excretion rate is the following formula:

$$\text{D-serine excretion rate}(Fe\_D\text{-Ser}) = \frac{U_{D-Ser}/P_{D-Ser}}{U_{Cre}/P_{Cre}} \quad [\text{Mathematical Formula 3}]$$

[where
$U_{D-Ser}$ represents the level of D-serine in the urine,
$P_{D-Ser}$ represents the level of D-serine in the blood,
$U_{Cre}$ represents the level of creatinine in the urine, and
$P_{Cre}$ represents the level of creatinine in the blood], and/or
the calculation formula for D-asparagine excretion rate is the following formula:

$$\text{D-asparagine excretion rate}(Fe\_D\text{-Asn}) = \frac{U_{D-Asn}/P_{D-Asn}}{U_{Cre}/P_{Cre}} \quad [\text{Mathematical Formula 4}]$$

[where
$U_{D-Asn}$ represents the level of D-asparagine in the urine,
$P_{D-Asn}$ represents the level of D-asparagine in the blood,
$U_{Cre}$ represents the level of creatinine in the urine, and
$P_{Cre}$ represents the level of creatinine in the blood].

[29] A program that causes an information processing device comprising an input unit, an output unit, a data processing unit and a storage unit to evaluate kidney condition, wherein the program includes a command to cause the information processing device:

to store in the storage unit a threshold value for evaluation of kidney condition inputted from the input unit, a calculation formula for D-serine excretion rate and/or a calculation formula for D-asparagine excretion rate in urine, and variables necessary for calculation, to store in the storage unit the D-serine level and/or D-asparagine level in a blood sample and/or urine sample and variables necessary for calculation of the D-serine excretion rate and/or D-asparagine excretion rate in urine, inputted from the input unit, to call the calculation formula for D-serine excretion rate and/or the calculation formula for D-asparagine excretion rate in urine that is prestored in the storage unit, and the D-serine level and/or D-asparagine level in a blood sample and/or urine sample and the variables, which are stored in the storage unit, and substitute them into the calculation formula for D-serine excretion rate and/or the calculation formula for D-asparagine excretion rate in urine to calculate the D-serine excretion rate and/or the D-asparagine excretion rate, in the data processing unit;

to compare the threshold stored in the storage unit and the D-serine excretion rate and/or the D-asparagine excretion rate in the data processing unit and evaluate kidney condition; and to output the evaluation results for kidney condition of the subject to the output unit.

[30] The program according to [29] above, wherein:

the calculation formula for D-serine excretion rate is the following formula:

$$\text{D-serine excretion rate}(Fe\_D\text{-Ser}) = \quad [\text{Mathematical Formula 5}]$$

$$\frac{U_{D-Ser}/P_{D-Ser}}{U_{Cre}/P_{Cre}}$$

[where $U_{D-Ser}$ represents the level of D-serine in the urine,
$P_{D-Ser}$ represents the level of D-serine in the blood,
$U_{Cre}$ represents the level of creatinine in the urine, and
$P_{Cre}$ represents the level of creatinine in the blood], and/or the calculation formula for D-asparagine excretion rate is the following formula:

$$\text{D-asparagine excretion rate}(Fe\_D\text{-}Asn) = \frac{U_{D-Asn}/P_{D-Asn}}{U_{Cre}/P_{Cre}} \quad \text{[Mathematical Formula 6]}$$

[where $U_{D-Asn}$ represents the level of D-asparagine in the urine,
$P_{D-Asn}$ represents the level of D-asparagine in the blood,
$U_{Cre}$ represents the level of creatinine in the urine, and
$P_{Cre}$ represents the level of creatinine in the blood].

Advantageous Effects of Invention

The method of analyzing the dynamics (reabsorption and excretion rate) of D-serine and/or D-asparagine in the kidneys according to the invention allows accurate assessment of kidney condition of patients in a wider range than by using the currently known kidney disease markers.

BRIEF DESCRIPTION OF DRAWINGS

FIG. 1 is a table showing logarithmic values for D-serine excretion rate and D-asparagine excretion rate in a non-kidney disease subject.

FIG. 2 is a table showing logarithmic values for D-serine excretion rate and D-asparagine excretion rate in a kidney disease subject.

DESCRIPTION OF EMBODIMENTS

Figure 3:
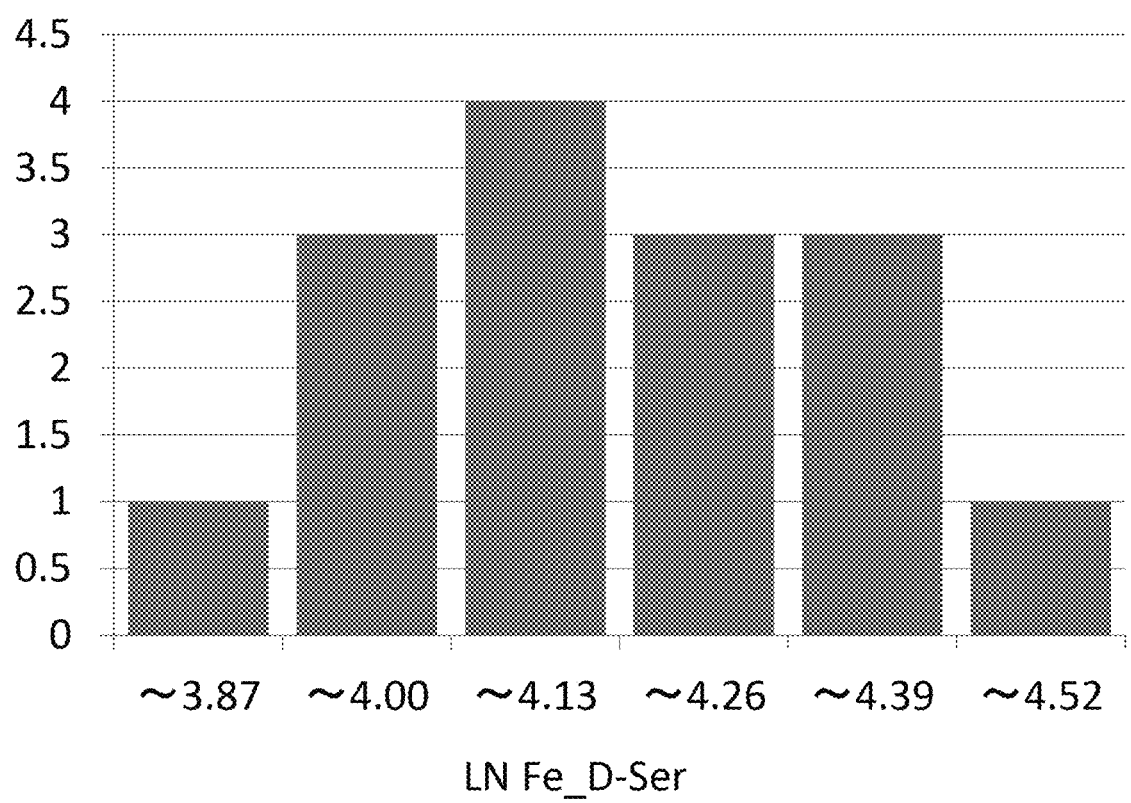
FIG. 3 is a logarithmic histogram for D-serine excretion rate calculated from D-serine levels and creatinine levels in blood and in urine, as measured for a subject.
Figure 4:
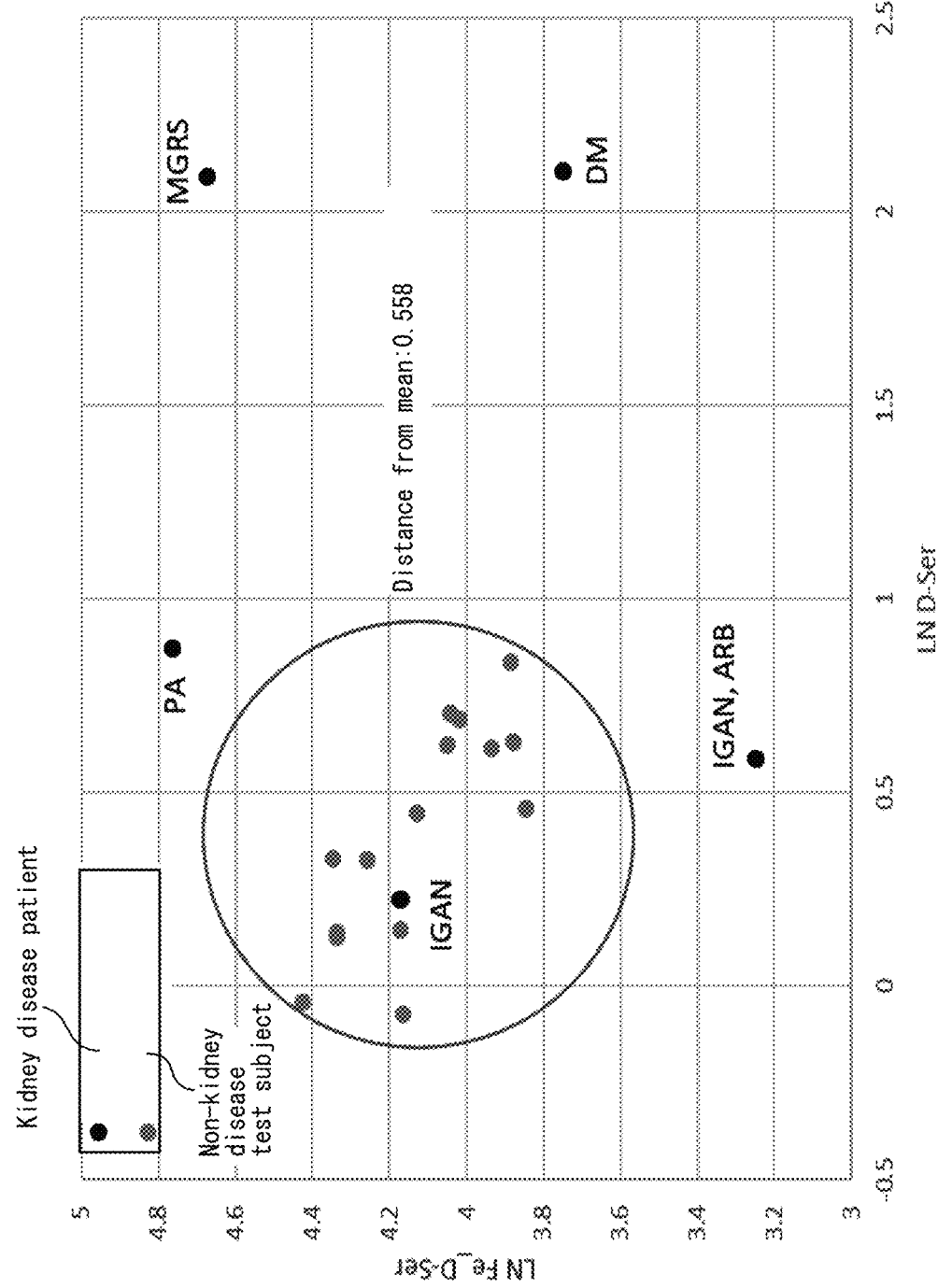
FIG. 4 is a logarithmic plot diagram for blood D-serine level and D-serine excretion rate, measured for a non-kidney disease test subject and a kidney disease patient.

The present invention relates to a method for evaluating kidney condition by analyzing the dynamics (reabsorption and excretion) of D-serine and/or D-asparagine in the kidneys. The present inventors have found that the dynamics (reabsorption and excretion) of both D-serine and D-asparagine in the kidneys reflect kidney condition, and that they can be used for assessment of kidney condition in a subject. The invention may therefore be a method for assessing kidney condition by analysis of the dynamics (reabsorption and excretion) of D-serine in the kidneys, a method for evaluating kidney condition by analysis of the dynamics (reabsorption and excretion) of D-asparagine in the kidneys, or a method for assessing kidney condition by analysis of the dynamics (reabsorption and excretion) of D-serine and D-asparagine in the kidneys. The results of analyzing the dynamics (reabsorption and excretion) of either D-serine or D-asparagine in the kidneys can be used for assessment of kidney condition, but using the results of analyzing the dynamics (reabsorption and excretion) of both D-serine and D-asparagine in the kidneys increases the precision of evaluation, allowing judgment of false negatives and false positives as well.

The terms "first, "second", etc. used throughout the present specification are used to distinguish one element from another, and a first element may be referred to as "second element", or similarly a second element may be referred to as "first element", without deviating from the gist of the invention.

Also throughout the specification, the phrase "excretion rate of D-serine into the urine of a subject" may be referred to as "subject D-serine excretion rate", and the phrase "excretion rate of D-serine into the urine of a non-kidney disease subject" may be referred to as "non-kidney disease subject D-serine excretion rate", with each being used interchangeably. Also throughout the specification, the phrase "excretion rate of D-asparagine into the urine of a subject" may be referred to as "subject D-asparagine excretion rate", and the phrase "excretion rate of D-asparagine into the urine of a non-kidney disease subject" may be referred to as "non-kidney disease subject D-asparagine excretion rate", with each being used interchangeably.

Also throughout the specification, the phrase "logarithmic converted subject D-serine excretion rate" may be referred to as "subject D-serine LN excretion rate", and the phrase "logarithmic converted value of the excretion rate of D-serine into the urine of a non-kidney disease subject" may be referred to as "non-kidney disease subject D-serine LN excretion rate", with each being used interchangeably. Also throughout the specification, the phrase "logarithmic converted subject D-asparagine excretion rate" may be referred to as "subject D-asparagine LN excretion rate", and the phrase "logarithmic converted value of the excretion rate of D-asparagine into the urine of a non-kidney disease subject" may be referred to as "non-kidney disease subject D-asparagine LN excretion rate", with each being used interchangeably.

As used herein, the simple term "subject" refers to any mammal, and preferably a human, regardless of the presence or absence of kidney disease. Also as used herein, the term "non-kidney disease subject" refers to a subject without kidney disease, or diagnosed as not having kidney disease, and for example, it is preferably a subject not suffering from kidney disease or other conditions that may elicit nephropathy.

According to one embodiment, the invention provides a method for assisting evaluation of kidney condition using the rate of reabsorption and excretion of D-serine and/or D-asparagine in the kidneys of a subject as markers. The rate of reabsorption and excretion of D-serine and D-asparagine can each be calculated by quantifying the amounts of D-serine and D-asparagine in blood, and the amounts of D-serine and D-asparagine in urine, respectively. According to one embodiment, therefore, the "rate of reabsorption and excretion of D-serine and/or D-asparagine in the kidneys of a subject" of the invention may be "the excretion rate of D-serine into urine of a subject" ("subject D-serine excretion rate") and/or the "excretion rate of D-asparagine into urine of a subject" ("subject D-asparagine excretion rate").

According to the invention, the excretion rate (excretion) is a marker representing the degree of discharge into urine of the amount of target components that have been filtered through the glomeruli by way of the regulating function of the renal tubules (reabsorption and secretion), and it is expressed as a proportion or percentage, or in arbitrary units. The value can be calculated after excluding the effect of reabsorption or concentration of water by correction using a correction factor, and expressed as fractional excretion (FE). Since urine often has a variable concentration rate, the rate of reabsorption and excretion of D-serine and/or D-asparagine in the kidneys of a subject may be corrected using a "correction factor" that corrects for the urine concentration rate. According to one embodiment of the invention, for example, the subject D-serine excretion rate and/or the subject D-asparagine excretion rate may be corrected by a correction factor derived from the blood and/or urine. In its most simple form, the excretion rate is expressed as a rate of the amount of target component in urine divided by the glomerular filtration rate for the target components, and the glomerular filtration rate obtained by inulin clearance or the actually measured urinary volume, as well as the amounts of target components in blood and/or in urine, may also be used for the calculation. L-amino acid levels (preferably the levels of L-serine and/or L-asparagine) in urine may also be used as urinary volume correction factors for calculation of the D-amino acid excretion rate. Creatinine clearance, calculated by urine creatinine level or the blood creatinine level, may also be used as a correction factor, expressing the D-serine excretion rate by the following formula, for example. This may then be multiplied by 100 to obtain a percent (%).

D-serine excretion rate(Fe_D-Ser) = [Mathematical Formula 7]

$$\frac{U_{D-Ser}/P_{D-Ser}}{U_{Cre}/P_{Cre}}$$

[$U_{D-Ser}$ represents urine D-serine level, $P_{D-Ser}$ represents blood D-serine level, $U_{Cre}$ represents urine creatinine level and $P_{Cre}$ represents blood creatinine level.]

The D-asparagine excretion rate is represented by the following formula, for example. This may then be multiplied by 100 to obtain a percent (%).

D-asparagine excretion rate(Fe_D-Asn) = [Mathematical Formula 8]

$$\frac{U_{D-Asn}/P_{D-Asn}}{U_{Cre}/P_{Cre}}$$

[$U_{D-Asn}$ represents urine D-asparagine level, $P_{D-Asn}$ represents blood D-asparagine level, $U_{Cre}$ represents urine creatinine level and $P_{Cre}$ represents blood creatinine level.]

Sodium fractional excretion is utilized to distinguish between kidney disease due to dehydration and due to nephropathy. Potassium fractional excretion and urea nitrogen fractional excretion are also used in the clinic as markers for assessment of pathology. Generally, excretion rate is understood to be based on the principle of homeostasis, in which excretion volume into urine generally increases with greater intake or biosynthesis of target components and decreases with lower intake and greater biodegradation. Therefore, damage or pathological changes to the kidneys that are carrying out major homeostasis of body components affects the changes in excretion rate. Creatinine, as a conventional kidney disease marker, is completely excreted while cystatin C is completely reabsorbed, but excretion and reabsorption of D-serine and D-asparagine are strictly controlled by the renal tubules, similar to electrolytes, suggesting that they can serve as more sensitive and highly precise pathology markers.

According to the invention, D-serine and D-asparagine used for analysis are the optical isomers of L-serine and L-asparagine, which are constituent amino acids of proteins. D-serine levels and D-asparagine levels are strictly regulated in the tissues and body fluids by metabolic enzymes such as serine racemase and D-amino acid oxidase, and by transporters, but D-serine levels and D-asparagine levels in the blood and urine vary with renal impairment.

According to the invention, "D-serine level and/or D-asparagine level in the blood and urine" may indicate the D-serine level and/or D-asparagine level in a specific blood volume or urinary volume, and they may also be represented as concentrations. The D-serine level and/or D-asparagine level in blood or urine is measured as the amount in a sample of blood or urine that has been treated by centrifugal separation, sedimentation separation or other pretreatment for analysis. Therefore, the D-serine level and/or D-asparagine level in blood or urine can be measured as the amount in a blood sample, such as harvested whole blood, serum or blood plasma, or the amount in a urine sample such as whole urine, or urine with the solid components and proteins removed. For analysis using HPLC, for example, the D-serine level in a predetermined amount of blood or urine is represented in a chromatogram, and the peak heights, areas, shapes and sizes may be quantified by analysis based on standard sample comparison and calibration. By comparing the D-serine and/or D-asparagine concentration with a known sample it is possible to measure the D-serine and/or D-asparagine concentration in blood or urine, and the D-serine and/or D-asparagine concentration in blood or urine can be used as the D-serine level and/or D-asparagine level in blood or urine. With an enzyme method, the amino acid concentration can be calculated by quantitative analysis using a standard calibration curve.

The D- and L-amino acid levels, such as levels of D-serine and/or D-asparagine and levels of L-serine and/or L-asparagine, may be measured by any method, such as chiral column chromatography, or measurement using an enzyme method, or quantitation by an immunological method using a monoclonal antibody that distinguishes between optical isomers of amino acids. Measurement of the D-serine and L-serine levels in a sample according to the invention may be carried out using any method well known to those skilled in the art. Examples include chromatographic and enzyme methods (Y. Nagata et al., Clinical Science, 73 (1987), 105. Analytical Biochemistry, 150 (1985), 238., A. D'Aniello et al., Comparative Biochemistry and Physiology Part B, 66 (1980), 319. Journal of Neurochemistry, 29 (1977), 1053., A. Berneman et al., Journal of Microbial & Biochemical Technology, 2 (2010), 139., W. G. Gutheil et al., Analytical Biochemistry, 287 (2000), 196., G. Molla et al., Methods in Molecular Biology, 794 (2012), 273., T. Ito et al., Analytical Biochemistry, 371 (2007), 167.), antibody methods (T. Ohgusu et al., Analytical Biochemistry, 357 (2006), 15), gas chromatography (GC) (H. Hasegawa et al., Journal of Mass Spectrometry, 46 (2011), 502., M. C. Waldhier et al., Analytical and Bioanalytical Chemistry, 394 (2009), 695., A. Hashimoto, T. Nishikawa et al., FEBS Letters, 296 (1992), 33., H. Bruckner and A. Schieber, Biomedical Chromatography, 15 (2001), 166., M. Junge et al., Chirality, 19 (2007), 228., M. C. Waldhier et al., Journal of Chromatography A, 1218 (2011), 4537), capillary electrophoresis methods (CE) (H. Miao et al., Analytical Chemistry, 77 (2005), 7190., D. L. Kirschner et al., Analytical Chemistry, 79 (2007), 736., F. Kitagawa, K. Otsuka, Journal of Chromatography B, 879 (2011), 3078., G. Thorsen and J. Bergquist, Journal of Chromatography B, 745 (2000), 389.), and high-performance liquid chromatography (HPLC) (N. Nimura and T. Kinoshita, Journal of Chromatography, 352 (1986), 169., A. Hashimoto et al., Journal of Chromatography, 582 (1992), 41., H. Bruckner et al., Journal of Chromatography A, 666 (1994), 259., N. Nimura et al., Analytical Biochemistry, 315(2003), 262., C. Muller et al., Journal of Chromatography A, 1324 (2014), 109., S. Einarsson et al., Analytical Chemistry, 59 (1987), 1191., E. Okuma and H. Abe, Journal of Chromatography B, 660 (1994), 243., Y. Gogami et al., Journal of Chromatography B, 879 (2011), 3259., Y. Nagata et al., Journal of Chromatography, 575 (1992), 147., S. A. Fuchs et al., Clinical Chemistry, 54 (2008), 1443., D. Gordes et al., Amino Acids, 40 (2011), 553., D. Jin et al., Analytical Biochemistry, 269 (1999), 124., J. Z. Min et al., Journal of Chromatography B, 879 (2011), 3220., T. Sakamoto et al., Analytical and Bioanalytical Chemistry, 408 (2016), 517., W. F. Visser et al., Journal of Chromatography A, 1218 (2011), 7130., Y. Xing et al., Analytical and Bioanalytical Chemistry, 408 (2016), 141., K. Imai et al., Biomedical Chromatography, 9 (1995), 106., T. Fukushima et al., Biomedical Chromatography, 9 (1995), 10., R. J. Reischl et al., Journal of Chromatography A, 1218 (2011), 8379., R. J. Reischl and W. Lindner, Journal of Chromatography A, 1269 (2012), 262., S. Karakawa et al., Journal of Pharmaceutical and Biomedical Analysis, 115 (2015), 123.).

The separative analysis system for optical isomers according to the invention may be a combination of multiple separative analysis methods. More specifically, the D-/L-amino acid level in a sample can be measured using an optical isomer analysis method comprising a step of passing a sample containing a component with optical isomers through a first column filler as the stationary phase, together with a first liquid as the mobile phase, to separate the components in the sample, a step of separately holding each of the components in the sample in a multi loop unit, a step of passing each of the components in the sample that are separately held in the multi loop unit through a flow channel in a second column filler having an optically active center, as the stationary phase, together with a second liquid as the mobile phase, to separate the optical isomers among each of the sample components, and a step of detecting the optical isomers in each of the sample components (Japanese Patent No. 4291628). In HPLC analysis, D- and L-amino acids are sometimes pre-derivatized with a fluorescent reagent such as o-phthalaldehyde (OPA) or 4-fluoro-7-nitro-2,1,3-benzo-oxadiazole (NBD-F), or diastereomerized using an agent such as N-tert-butyloxycarbonyl-L-cysteine (Boc-L-Cys) (Hamase, K. and Zaitsu, K., Bunseki Kagaku, Vol. 53, 677-690 (2004)). Alternatively, the D-amino acids may be measured by an immunological method using a monoclonal antibody that distinguishes optical isomers of amino acids, such as a monoclonal antibody that specifically binds to D-serine, L-serine, D-asparagine or L-asparagine. When the total of the D-form and L-form is to be used as the marker it is not necessary to separate the D-form and L-form, allowing the amino acids to be analyzed without separating the D-form and L-form. In such cases as well, separation and quantitation may be carried out using an enzyme method, antibody method, GC, CE or HPLC.

Blood D-serine levels and D-asparagine levels correlate more strongly with glomerular filtration rate than the conventional marker of creatinine. This is because blood levels of creatinine are significantly affected by muscle mass, and therefore sports athletes, acromegaly patients and persons that have ingested large amounts of meat will exhibit higher values, while patients suffering from neuromuscular disease (such as muscular dystrophy), emaciation, prolonged bed rest, frailty, sarcopenia, locomotive syndrome or amputation, or persons that have restricted their protein intake, will exhibit lower values, making it impossible to accurately reflect renal function. In healthy persons without presence of disease, blood D-serine level is kept to within a very narrow range of about 1 to 2% of total serine, whereas its presence in urine reaches 30 to 60%. Interestingly, while about 99% of L-serine is reabsorbed in the renal tubules, about 50 to 80% of D-serine is excreted. Moreover, in healthy persons without presence of disease, blood D-asparagine level is kept to within a very narrow range of about 0.1 to 0.6% of total asparagine, whereas its presence in urine reaches 20 to 50%. Interestingly, while about 99% of L-asparagine is reabsorbed in the renal tubules, about 50 to 80% of D-asparagine is excreted.

Unlike blood D-serine level and D-asparagine level, the excretion rates of D-serine and D-asparagine used for the purpose of the invention do not correlate with glomerular filtration rate, as has been shown by chiral amino acid metabolomics and multivariate analysis of related parameters (OPLS). As it has been suggested that reabsorption of optical isomers of serine and asparagine is strictly regulated in the renal tubules of the kidneys, 15 healthy volunteers were recruited as a survey population for analysis of D-serine and D-asparagine excretion rates in non-kidney disease test subjects, in order to examine the physiological significance of D-serine and D-asparagine. The test protocol was approved by the ethics committee of the national research and development agency: National Institutes of Biomedical Innovation, Health and Nutrition, and written informed consent was obtained from all of the test subjects. The group of non-kidney disease test subjects had an average age of 44 and were 80% male, with average height of 1.70 m, average weight of 68.9 kg, average BSA of 1.80 $m^2$, mean BMI of 22.6 $kg/m^2$ and mean serum creatinine of 0.75 mg/dL.

Using the following formula with quantitative analysis values for D-serine and D-asparagine in the blood and urine of the test subjects, the mean excretion rate for D-serine was 62.76%, with a mean logarithmic value calculated to be 4.12, and the mean excretion rate for D-asparagine was 64.12%, with a mean logarithmic value calculated to be 4.16 (FIG. 1).

D-serine excretion rate(Fe_D-Ser) =  [Mathematical Formula 9]

$$\frac{U_{D-Ser}/P_{D-Ser}}{U_{Cre}/P_{Cre}}$$

[$U_{D-Ser}$ represents urine D-serine level, $P_{D-Ser}$ represents blood D-serine level, $U_{Cre}$ represents urine creatinine level and $P_{Cre}$ represents blood creatinine level.]

D-asparagine excretion rate(Fe_D-Asn) =  [Mathematical Formula 10]

$$\frac{U_{D-Asn}/P_{D-Asn}}{U_{Cre}/P_{Cre}}$$

For D-serine, since a normal distribution-like shape was observed in the histogram of the obtained logarithmic data prepared at the 6th quantile (FIG. 3), the data were analyzed by a Shapiro-Wilk Normality Test, which resulted in a value of P=0.395 such that the null hypothesis could not be discarded, thus supporting the possibility of a normal distribution. The reference values for the non-kidney disease test subjects were therefore 42.46 to 89.66% as mean with standard deviation of ±1.96, with the logarithm calculated to be 3.75 to 4.50, and this can assist in predicting whether subjects outside of this range have kidney disease, nephropathic conditions or risk or prognosis.

Figure 5:
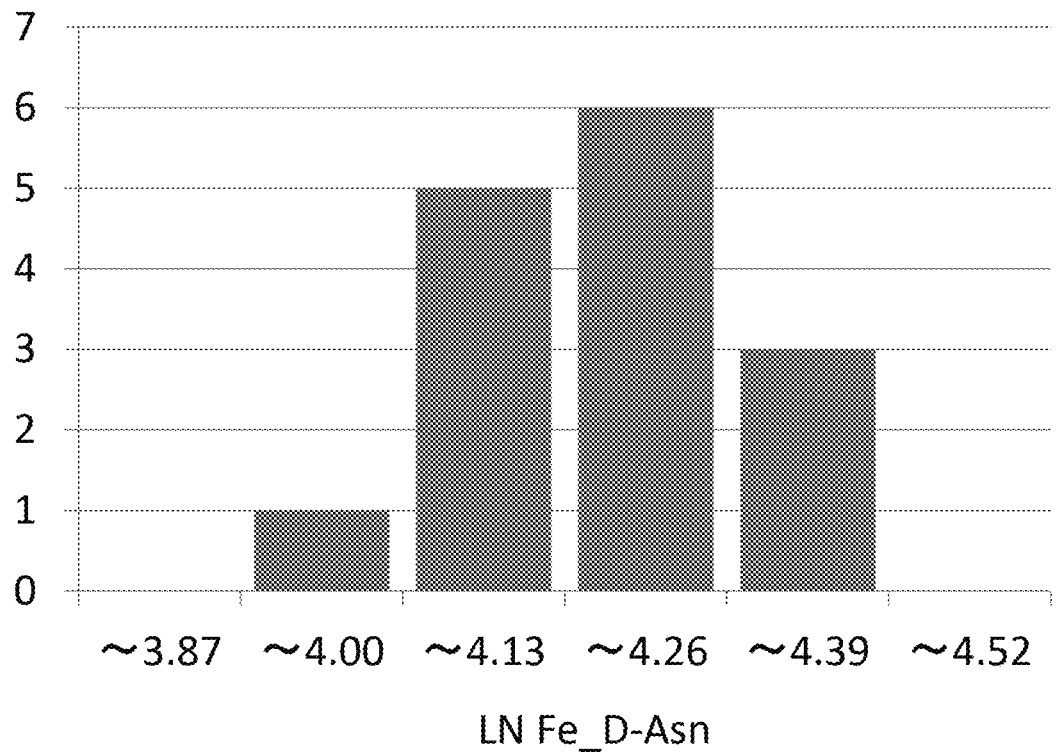
FIG. 5 is a logarithmic histogram for D-asparagine excretion rate calculated from D-asparagine levels and creatinine levels in blood and in urine, as measured for a subject.
Figure 6:
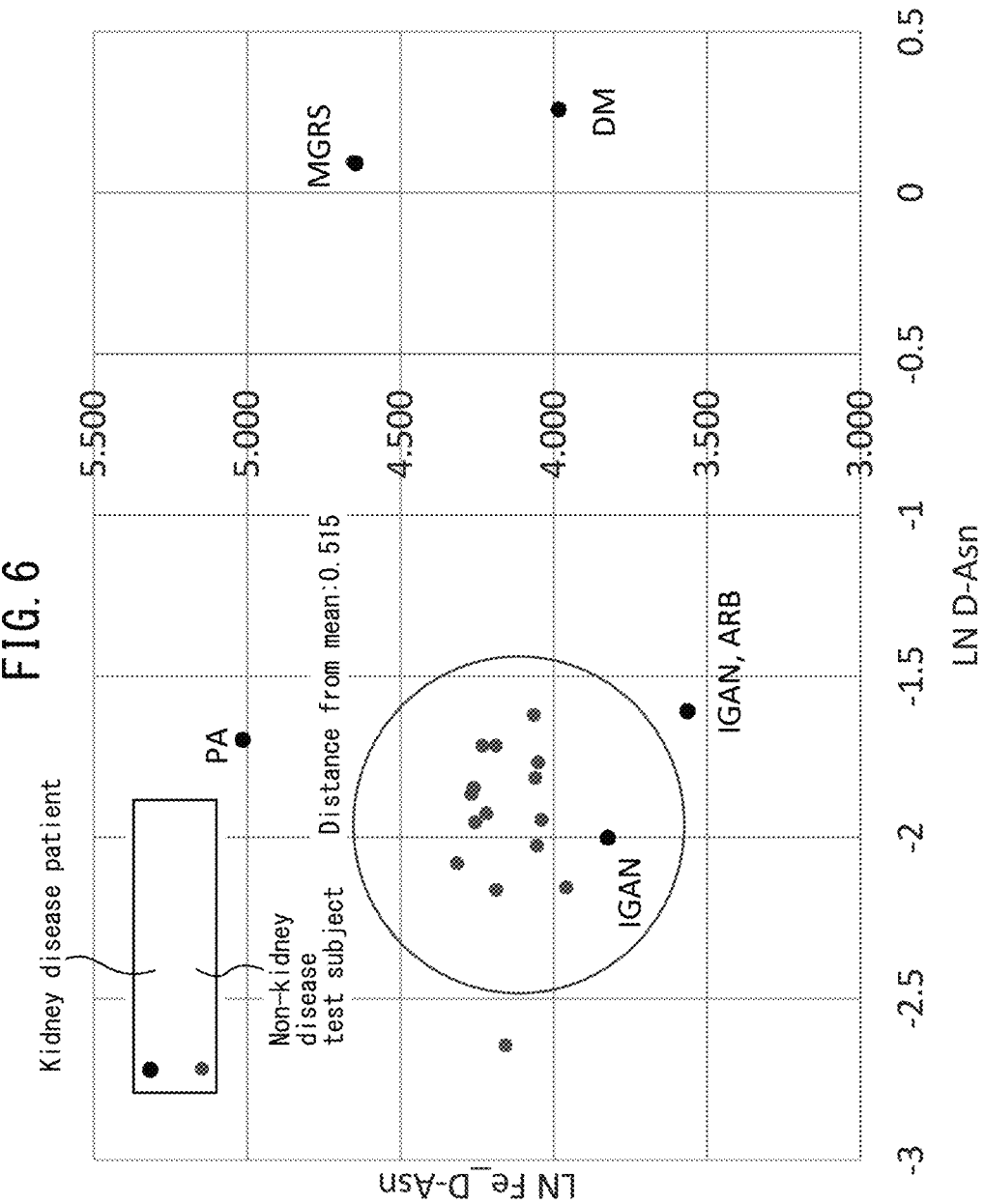
FIG. 6 is a logarithmic plot diagram for blood D-asparagine level and D-asparagine excretion rate, measured for a non-kidney disease test subject and a kidney disease patient.
Figure 7:
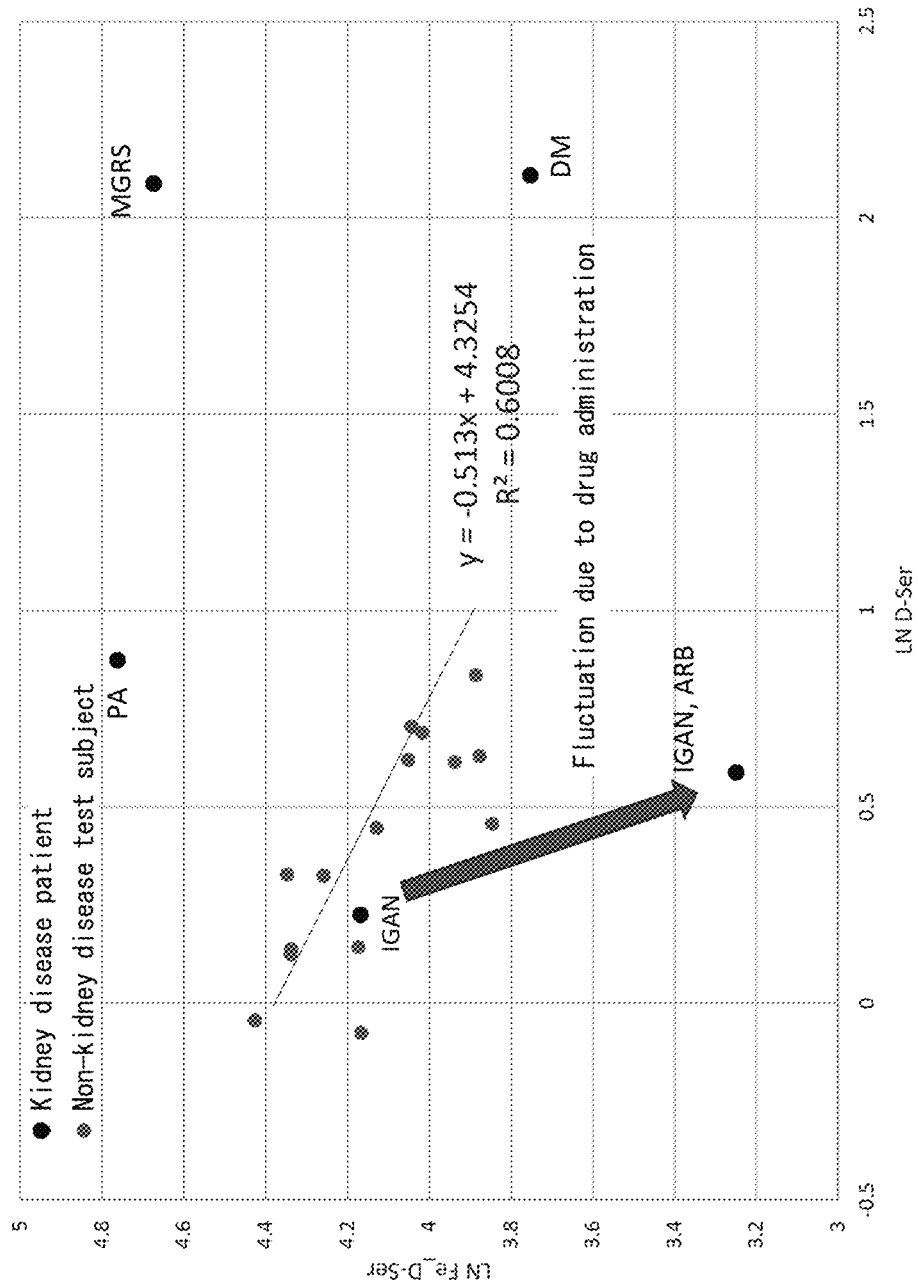
FIG. 7 is a logarithmic plot diagram for blood D-serine level and D-serine excretion rate, measured for a non-kidney disease test subject and a kidney disease patient.
Figure 8:
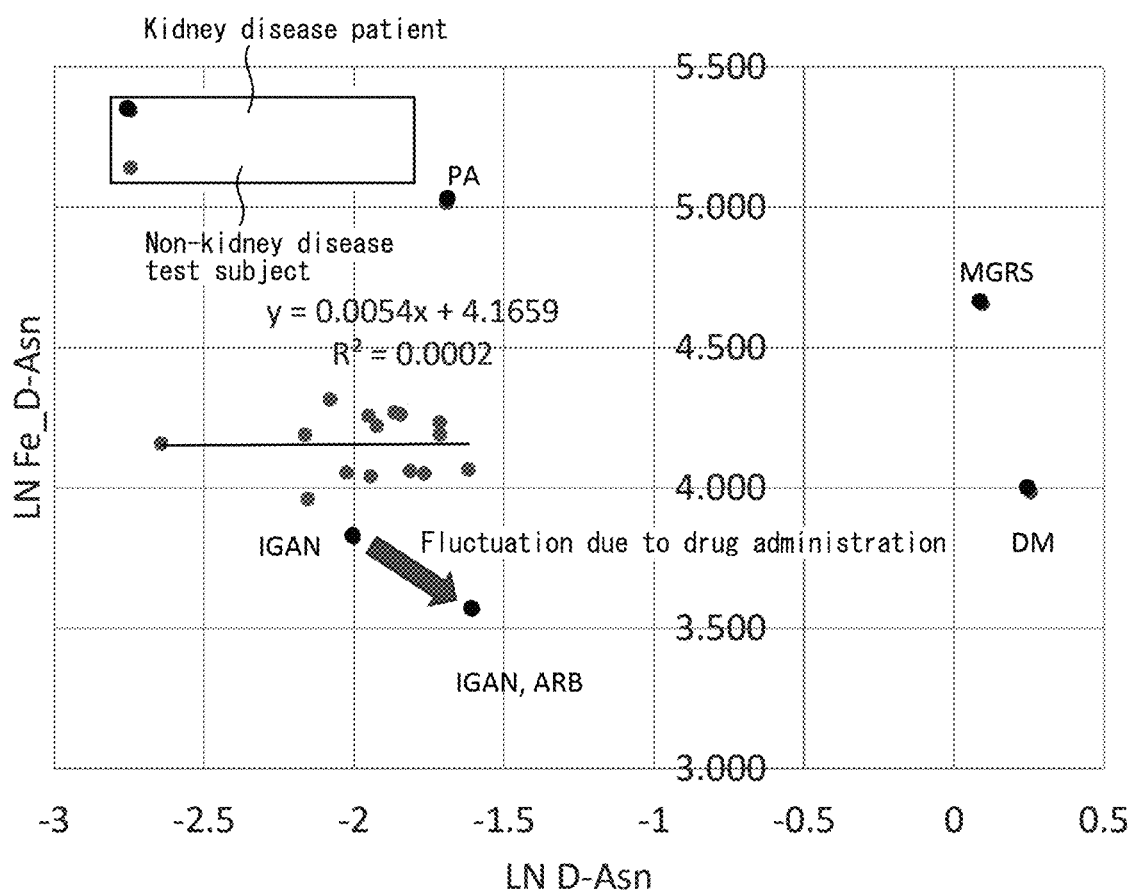
FIG. 8 is a logarithmic plot diagram for blood D-asparagine level and D-asparagine excretion rate, measured for a non-kidney disease test subject and a kidney disease patient.
Figure 9:
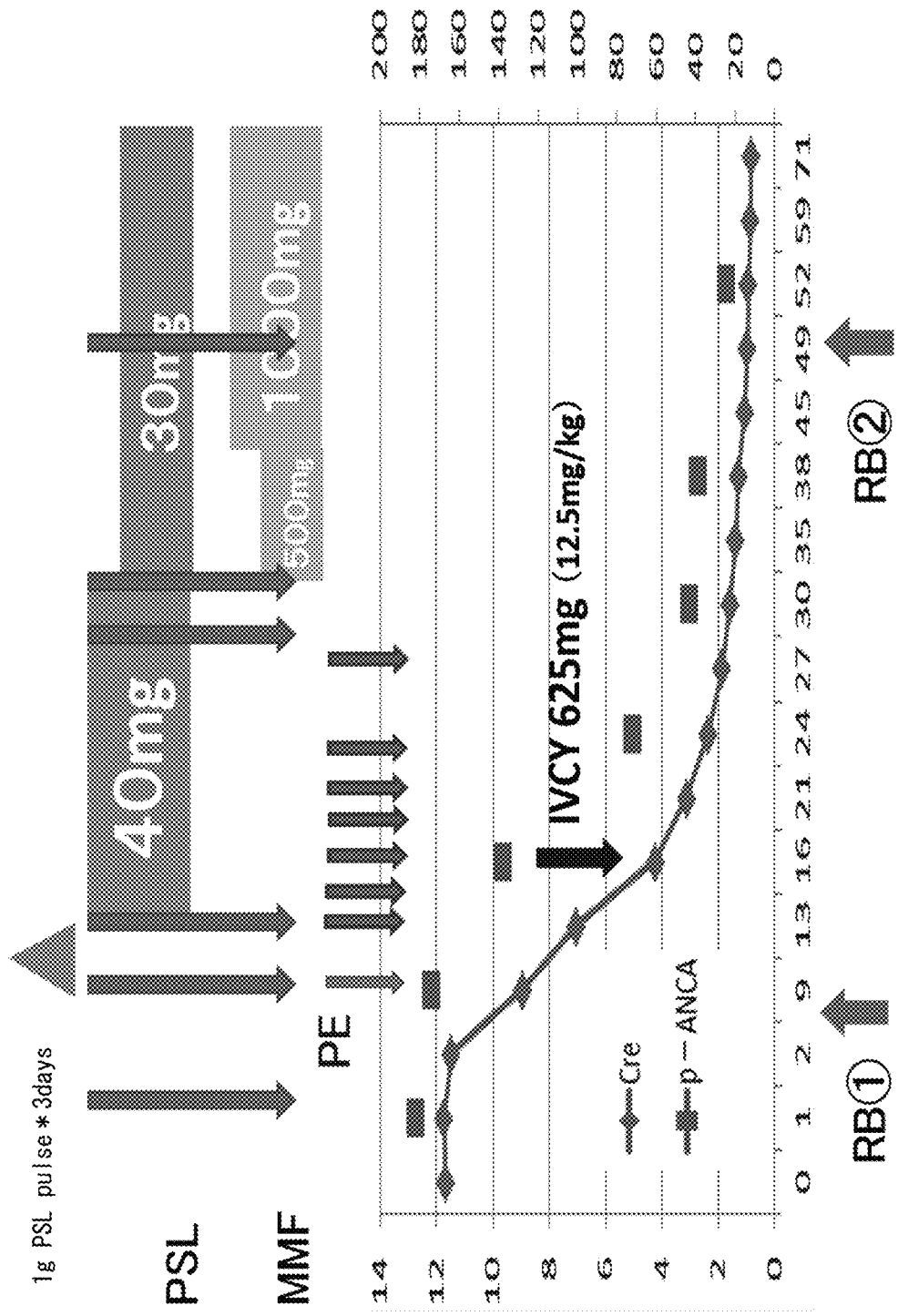
FIG. 9 is a chart showing the course of treatment and dosing for a systemic lupus erythematosus patient.
Figure 10:
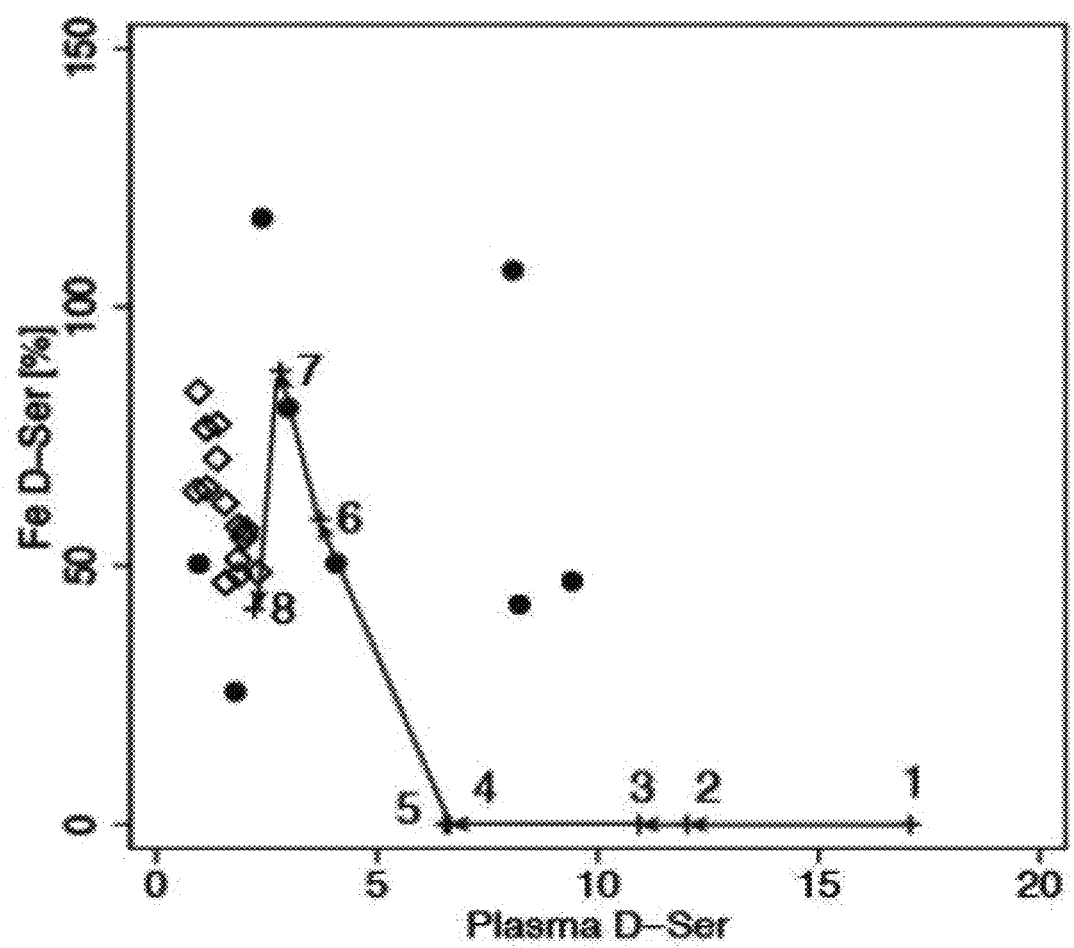
FIG. 10 is a graph plotting blood D-serine level and D-serine excretion rate, measured periodically before and after therapeutic intervention for a systemic lupus erythematosus patient.

For D-asparagine, since a normal distribution-like shape was observed in the histogram of the obtained logarithmic data prepared at the 6th quantile (FIG. 5), the data were analyzed by a Shapiro-Wilk Normality Test, which resulted in a value of P=0.243, such that the null hypothesis could not be discarded, thus supporting the possibility of a normal distribution. The reference values for the non-kidney disease test subjects were therefore 51.65 to 78.74% as mean with standard deviation of ±1.96, with the logarithm calculated to be 3.95 to 4.37, and this can assist in predicting whether subjects outside of this range have kidney disease, nephropathic conditions or risk or prognosis.

Since blood D-serine level and D-asparagine level correlate strongly with glomerular filtration rate, their analysis can be applied to severity classifications (G1 to 5) for chronic kidney disease (CKD), defined according to the guidelines of the Japanese Society of Nephrology, but since the D-serine excretion rate analyzed with urine D-serine level or D-asparagine excretion rate analyzed with urine D-asparagine level can assist evaluation of kidney condition by a completely different mechanism not correlated with glomerular filtration rate, these are highly useful for clinical distinction and prognosis and diagnosis of pathology, which have been difficult with conventional markers.

According to one embodiment, the invention can provide a method comprising:
comparing the subject D-serine excretion rate and/or the subject D-asparagine excretion rate with a first reference calculated from the excretion rates of D-serine into urine of multiple non-kidney disease subjects (non-kidney disease subject D-serine excretion rates) and/or the excretion rates of D-asparagine into urine of multiple non-kidney disease subjects (non-kidney disease subject D-asparagine excretion rates), and
evaluating kidney condition based on the relationship between the subject D-serine excretion rate and/or the subject D-asparagine excretion rate, and the first reference.

According to a first embodiment of the invention, for example, the invention can provide a method which includes a step of:
comparing the subject D-serine excretion rate with a first reference calculated from the excretion rates of D-serine into urine of multiple non-kidney disease subjects (non-kidney disease subject D-serine excretion rates), and
evaluating kidney condition based on the relationship between the subject D-serine excretion rate and the first reference.

According to a second embodiment of the invention, for example, the invention can provide a method which includes a step of:
comparing the subject D-asparagine excretion rate with a first reference calculated from the excretion rates of D-asparagine into urine of multiple non-kidney disease subjects (non-kidney disease subject D-asparagine excretion rate), and
evaluating kidney condition based on the relationship between the subject D-asparagine excretion rate and the first reference.

The method of the first embodiment and the method of the second embodiment may also be combined to evaluate kidney condition, which will not only improve the precision of evaluating kidney condition but will also allow false positivity and false negativity to be assessed.

As used herein, "first reference" means a reference calculated from the excretion rates into urine of multiple non-kidney disease subjects (non-kidney disease subject D-serine excretion rates) and/or the excretion rates of D-asparagine into urine of multiple non-kidney disease subjects (non-kidney disease subject D-asparagine excretion rate), and used for evaluation of kidney condition of a subject. Specifically, kidney condition of a subject can be evaluated by comparing the subject D-serine excretion rate and/or the subject D-asparagine excretion rate with the first reference. The number of "non-kidney disease subjects" used to calculate the first reference is preferably a number sufficient to calculate a statistically significant reference, and for the purpose of the invention a number of, for example, 3, 5, 10, 15, 20, 30, 50, 100 or greater may be used.

According to one embodiment, the first reference of the invention may be in the range of mean±SD× coefficient Z for the non-kidney disease subject D-serine excretion rates and/or non-kidney disease subject D-asparagine excretion rates. As used herein, "coefficient Z" is a coefficient used to calculate the confidence interval used for statistical analysis, and it is preferably a value of 1.0 to 3.0, for example, and more preferably 1.96. According to one embodiment, the first reference is preferably in the range of 0.4 to 0.9.

According to one embodiment, the step of evaluating kidney condition may evaluate kidney disease or morbidity risk of the subject or predict occurrence or prognosis of kidney disease, when the subject D-serine excretion rate and/or the subject D-asparagine excretion rate are not within the range of the first reference.

According to another embodiment, the invention can provide a method which includes a step of:
comparing the logarithmic converted subject D-serine excretion rate (subject D-serine LN excretion rate)

and/or the logarithmic converted subject D-asparagine excretion rate (subject D-asparagine LN excretion rate) with a second reference calculated from the logarithmic converted values of the excretion rates of D-serine into urine of multiple non-kidney disease subjects (non-kidney disease subject D-serine LN excretion rates) and/or the logarithmic converted values of the excretion rates of D-asparagine into urine of multiple non-kidney disease subjects (non-kidney disease subject D-asparagine LN excretion rates), and evaluating kidney condition based on the relationship between the subject D-serine LN excretion rate and/or the subject D-asparagine LN excretion rate, and the second reference.

According to the first embodiment of the invention, the invention can provide a method which includes a step of:

comparing the logarithmic converted subject D-serine excretion rate (subject D-serine LN excretion rate) with a second reference calculated from the logarithmic converted values of the excretion rate of D-serine into urine of multiple non-kidney disease subjects (non-kidney disease subject D-serine LN excretion rates), and evaluating kidney condition based on the relationship between the subject D-serine LN excretion rate and the second reference.

According to the second embodiment of the invention, the invention can provide a method which includes a step of:

comparing the logarithmic converted subject D-asparagine excretion rate (subject D-asparagine LN excretion rate) with a second reference calculated from the logarithmic converted values of the excretion rates of D-asparagine into urine of multiple non-kidney disease subjects (non-kidney disease subject D-asparagine LN excretion rates), and evaluating kidney condition based on the relationship between the subject D-asparagine LN excretion rate and the second reference.

The method of the first embodiment and the method of the second embodiment may also be combined to evaluate kidney condition, which will not only improve the precision of evaluating kidney condition but will also allow false positivity and false negativity to be assessed.

As used herein, the "logarithmic converted value" is the value obtained by logarithmically converting the value of interest, and it may be the value of interest that has been converted to the natural logarithm, or the value of interest that has been converted to a common logarithm using any base.

As used herein, "second reference" means a reference calculated from the logarithmic converted excretion rates of D-serine into urine of multiple non-kidney disease subjects (non-kidney disease subject D-serine LN excretion rates) and/or the logarithmic converted excretion rates of D-asparagine into urine of multiple non-kidney disease subjects (non-kidney disease subject D-asparagine LN excretion rates), and used for evaluation of kidney condition of a subject. Specifically, kidney condition of a subject can be evaluated by comparing the subject D-serine LN excretion rate and/or the subject D-asparagine LN excretion rate with the second reference. The number of "non-kidney disease subjects" used to calculate the second reference is preferably a number sufficient to calculate a statistically significant reference, and for the purpose of the invention a number of, for example, 3, 5, 10, 15, 20, 30, 50, 100 or greater may be used.

According to one embodiment, the second reference of the invention may be in the range of mean±SD×coefficient Z for the non-kidney disease subject D-serine LN excretion rates and/or non-kidney disease subject D-asparagine LN excretion rates. In this case the coefficient Z is preferably a value of 1.0 to 3.0, and more preferably 1.96. According to one embodiment, the second reference is preferably in the range of 3.5 to 5.0.

According to one embodiment, the step of evaluating kidney condition may evaluate kidney disease or morbidity risk of the subject or predict occurrence or prognosis of kidney disease, when the subject D-serine LN excretion rate and/or the subject D-asparagine LN excretion rate are not within the range of the second reference.

When pathology is assessed by the method of the invention, it may be used as the basis to determine a treatment policy. The treatment method may be selected as appropriate for the pathology, and the excretion rates of D-serine and/or D-asparagine may be periodically monitored and controlled so that they are within the reference ranges for non-kidney-disease subjects. Therapeutic intervention is guidance for one or a combination from among lifestyle habit improvement, dietary guidance, blood pressure management, anemia management, electrolyte management, uremia management, blood sugar level management, immune management or lipid management. Lifestyle habit improvement may be a recommendation to stop smoking or to reduce the BMI value to below 25. Dietary guidance may be salt or protein restriction. For blood pressure management, anemia management, electrolyte management, uremic toxin manage, blood sugar level management, immune management or lipid management in particular, treatment may involve administration of a drug. Blood pressure management may involve general management or administration of an antihypertensive drug, to reach below 130/80 mmHg. Antihypertensive drugs include diuretic drugs (thiazide diuretics such as trichlormethiazide, benzylhydrochlorothiazide and hydrochlorothiazide, thiazide-like diuretics such as meticrane, indapamide, tribamide and mefluside, loop diuretics such as furosemide, and potassium-sparing diuretics and aldosterone antagonists such as triamterene, spironolactone and eplerenone), calcium antagonists (dihydropyridine-based antagonists such as nifedipine, amlodipine, efonidipine, cilnidipine, nicardipine, nisoldipine, nitrendipine, nilvadipine, barnidipine, felodipine, benidipine, manidipine, azelnidipine and aranidipine, benzodiazepine-based antagonists, and diltiazem), angiotensin converting enzyme inhibitors (such as captopril, enalapril, acelapril, delapril, cilazapril, lisinopril, benazepril, imidapril, temocapril, quinapril, trandolapril and perindopril erbumine), angiotensin receptor antagonists (angiotensin II receptor antagonists such as losartan, candesartan, valsartan, telmisartan, olmesartan, irbesartan and azilsartan), and sympatholytic drugs (β-blockers, such as atenolol, bisoprolol, betaxolol, metoprolol, acebutolol, celiprolol, propranolol, nadolol, carteolol, pindolol, nipradilol, amosulalol, arotinolol, carvedilol, labetalol, bevantolol, urapidil, terazosin, prazosin, doxazosin and bunazosin). Erythropoietin formulations, iron agents and HIF-1 inhibitors are used as anemia treatments. Calcium receptor agonists (such as cinacalcet and etelcalcetide) and phosphorus adsorbents are used as electrolyte regulators. Active carbon is used as a uremic toxin adsorbent. Blood glucose level is managed to Hba1c of <6.9%, and in some cases a hypoglycemic agent is administered. Hypoglycemic agents that are used include SGLT2 inhibitors (such as ipragliflozin, dapagliflozin, luseogliflozin, tofogliflozin, canagliflozin and empagliflozin), DPP4 inhibitors (such as sitagliptin phosphate, vildagliptin, saxagliptin, alogliptin, linagliptin, teneligliptin, trelagliptin, anagliptin, omarigliptin), sulfonylurea agents (such as tolbutamide, acetohexamide, chlorpropamide, glyclopyramide, glibenclamide, gliclazide and glimepiride), thiazolidine agents (such as pioglitazone), biguanide agents (such as metformin and buformin), α-glucosidase inhibitors (such as acarbose, voglibose and miglitol), glinide agents (such as nateglinide, mitiglinide and repaglinide), insulin formulations and NRF2 activators (such as bardoxolonemethyl). Immunosuppressive agents (such as steroids, tacrolimus, anti-CD20 antibody, cyclohexamide and mycophenolate mofetil (MMF)) are used for immune management. Lipid management includes management to lower LDL-C to below 120 mg/dL, or in some cases dyslipidemia treatments are used, including statins (such as rosuvastatin, pitavastatin, atorvastatin, cerivastatin, fluvastatin, simvastatin, pravastatin, lovastatin and mevastatin), fibrates (such as clofibrate, bezafibrate, fenofibrate and clinofibrate), nicotinic acid derivatives (such as nicotinic acid derivatives (tocopherol nicotinate, nicomol and niceritrol), cholesterol transporter inhibitors (such as ezetimibe), PCSK9 inhibitors (such as evolocumab) and EPA formulations. All of these drugs may be used as single dosage forms or mixtures. Depending on the degree of renal function impairment, renal replacement therapy such as peritoneal dialysis, hemodialysis, continuous hemodialysis filtration, blood apheresis (such as blood plasma exchange or blood plasma adsorption) or kidney transplant may also be carried out.

According to one embodiment, therefore, the invention may be a method of monitoring kidney condition wherein the excretion rate of D-serine into urine of a subject (subject D-serine excretion rate) and/or the excretion rate of D-asparagine into urine of a subject (subject D-asparagine excretion rate) is periodically measured, and the fluctuation is used as a marker. According to another embodiment, the invention may be a method of monitoring the therapeutic effect on kidney disease, wherein the excretion rate of D-serine into urine of a subject with kidney disease (subject D-serine excretion rate) and/or the excretion rate of D-asparagine into urine of a subject with kidney disease (subject D-asparagine excretion rate) is periodically measured before and after therapeutic intervention, and the fluctuation is used as a marker.

The method of the invention can be used to evaluate kidney disease in a subject, such as kidney disease caused by chronic kidney disease, myeloma kidney, diabetic nephropathy, IgA nephropathy, interstitial nephritis or polycystic kidney, or systemic lupus erythematosus, primary aldosteronism, prostatic hypertrophy, Fabry disease or microvariant nephrotic syndrome.

Figure 11:
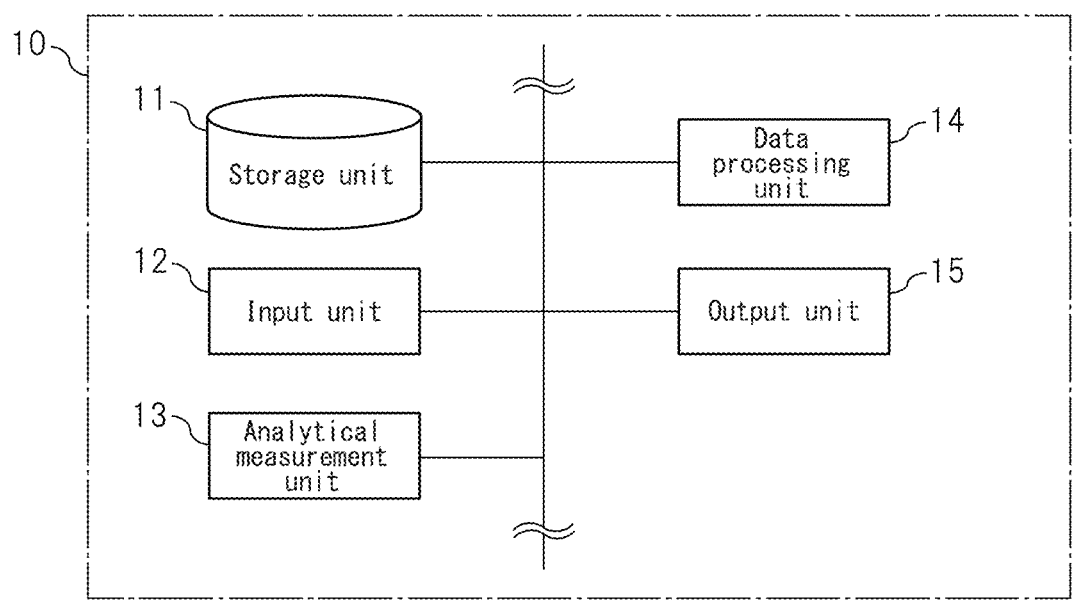
FIG. 11 is a block diagram of a system for evaluating kidney condition according to the invention.

According to another aspect, the invention relates to a system and program for carrying out the aforementioned method for assisting evaluation of kidney condition. FIG. 11 is a block diagram of a system for evaluating kidney condition according to the invention. The sample analysis system 10 shown in FIG. 11 is constructed so as to allow the method for assisting evaluation of kidney condition of the invention to be carried out. The sample analysis system 10 comprises a storage unit 11, an input unit 12, an analytical measurement unit 13, a data processing unit 14 and an output unit 15, and allows analysis of blood samples and/or urine samples, and output of calculated excretion rates and pathological information.

More specifically, in the sample analysis system 10 of the invention, the storage unit 11 stores an excretion rate calculated from D-serine and/or D-asparagine levels in a blood sample or in a urine sample that have been inputted through the input unit 12, and also a reference value and a table or graph corresponding to pathological information, the analytical measurement unit 13 separates and quantifies D-serine and/or D-asparagine in a blood sample and/or urine sample, the data processing unit 14 substitutes the values into a formula obtained from the excretion rate calculated from the D-serine and/or D-asparagine levels, and the reference value and pathological information, or reads them out from the corresponding table or graph, to assess pathology, and the output unit 15 outputs the pathological information.

According to a more preferred aspect, the system for evaluating kidney condition of the invention may further include a step in which the storage unit 11 stores a reference value inputted from the input unit 12, and a step in which the data processing unit 14 compares the separated and quantified excretion rate calculated from the D-serine and/or D-asparagine levels with the reference value. In this case, the output unit 15 outputs a signal indicating possible kidney disease when the D-serine excretion rate and/or the D-asparagine excretion rate is outside of the reference range.

The storage unit 11 has a portable storage device which may be a memory device such as a RAM, ROM or flash memory, a fixed disk device such as a hard disk drive, or a flexible disk or optical disk. The storage unit stores data measured by the analytical measurement unit, data and instructions inputted from the input unit, and results of computation processing by the data processing unit, as well as the computer program and database to be used for processing by the information processing equipment. The computer program may be a computer readable recording medium such as a CD-ROM or DVD-ROM, or it may be installed via the internet. The computer program is installed in the storage unit using a commonly known setup program, for example. The storage unit stores data for the formula derived from the relationship between D-serine excretion rate and pathology, or for the corresponding table or graph, which have been inputted through the input unit 12 beforehand. Kidney condition classifications corresponding to excretion rate may also be stored.

The input unit 12 is an interface and also includes operating devices such as a keyboard and mouse. This allows the input unit to input data measured by the analytical measurement unit 13 and instructions for computation processing to be carried out by the data processing unit 14. When the analytical measurement unit 13 is external, for example, the input unit 12 may also include an interface unit allowing input of measured data through a network or storage medium, separately from the operating device.

The analytical measurement unit 13 carries out a step of measuring D-serine and/or D-asparagine in a blood sample and/or urine sample. The analytical measurement unit 13 therefore has a construction allowing separation and measurement of the D-forms and L-forms of amino acids. The amino acids may be analyzed one at a time, or some or all of the amino acid types may be analyzed at once. With no intention to be limitative, the analytical measurement unit 13 may be a chiral chromatography system comprising a sample introduction inlet, an optical resolution column and a detector, for example, and it is preferably a high-performance liquid chromatography system. From the viewpoint of detecting the levels of only specific amino acids, quantitation may be carried out by an enzyme method or immunological method. The analytical measurement unit 13 may be constructed separately from the system for evaluating kidney condition, and measured data may be inputted through the input unit 12 using a network or storage medium.

The data processing unit 14 calculates excretion rates from measured D-serine and/or D-asparagine, and substitutes the values into a formula derived from the relationship with excretion volume, or reads off from a corresponding table or graph, to evaluate and assess kidney condition. When the formula derived from the relationship between D-serine excretion rate and/or D-asparagine excretion rate, or the corresponding table or graph, requires other correction values such as age, body weight, gender or body height, that information may also be inputted beforehand through the input unit and stored in the storage unit. During calculation of the excretion rate and pathological information, the data processing unit may access the information and input it into the formula, or read out a value from the corresponding table or graph, to calculate the excretion rate and pathological information. The data processing unit 14 may also determine a kidney disease or kidney condition category from the determined excretion rate and pathological information. The data processing unit 14 carries out various computation processing operations on the data measured by the analytical measurement unit 13 and stored in the storage unit 11, based on a program stored in the storage unit. The computation processing is carried out by a CPU in the data processing unit. The CPU includes a functional module that controls the analytical measurement unit 13, input unit 12, storage unit 11 and output unit 15, with the functional module performing various control operations. Each of the units may be constructed by independent integrated circuits, microprocessors and firmware.

The output unit 15 is constructed so as to output the excretion rate and pathological information, as the result of computation processing by the data processing unit. The output unit 15 may be output means such as a display device with a liquid crystal display that directly displays the computation processing results, or a printer, or it may be an interface unit for output to an external memory unit or output to a network. It may also output the D-serine excretion rate and/or D-asparagine excretion rate, and/or kidney condition category, either in combination with glomerular filtration capacity, or independently.

Figure 12:
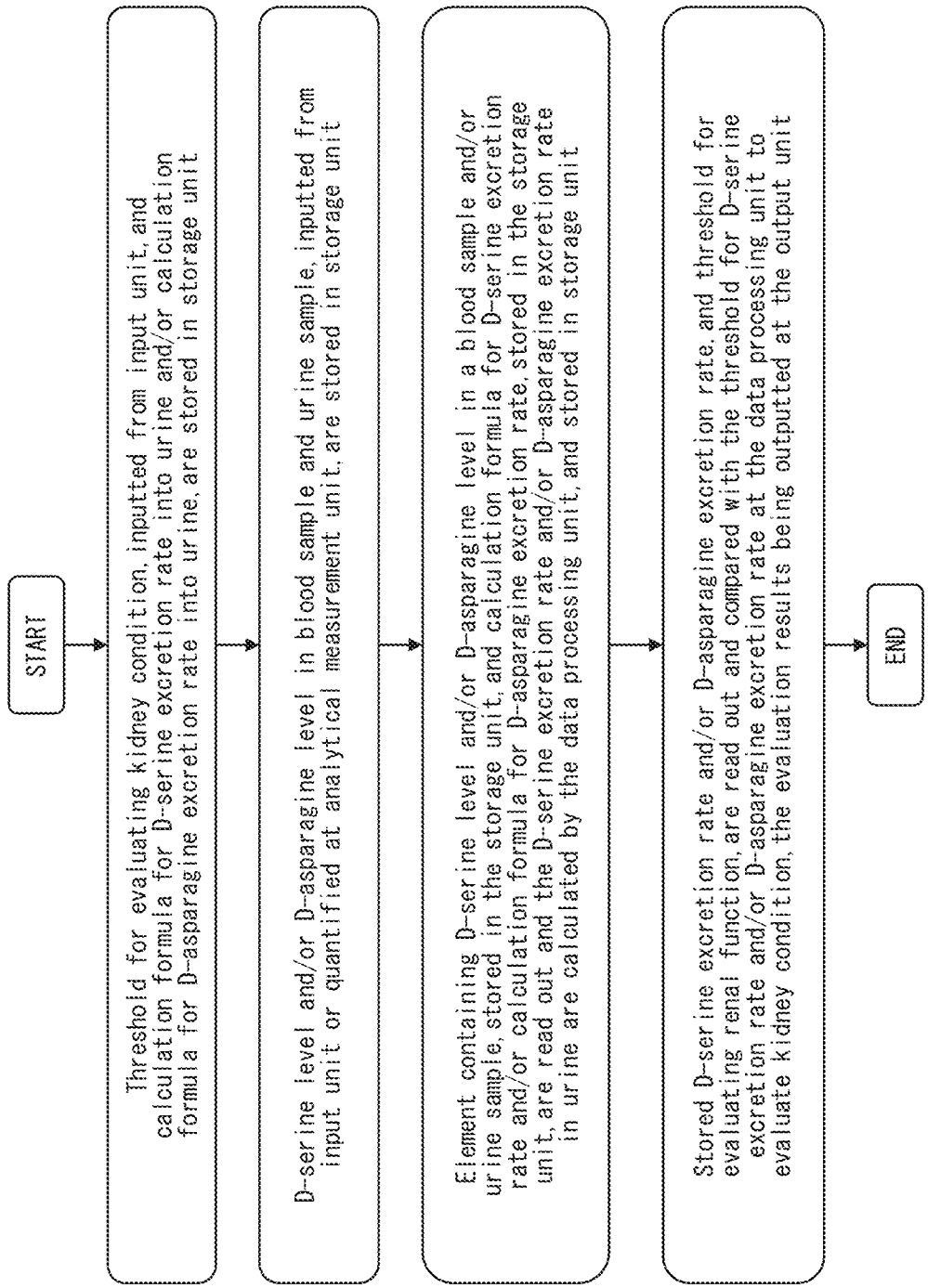
FIG. 12 is a flow chart showing an example of operation for evaluating kidney condition by the program of the invention.

FIG. 12 is a flow chart showing an example of operation for determining excretion rate and pathological information by the program of the invention. Specifically, the program of the invention is a program that evaluates kidney condition in an information processing device comprising an input unit, output unit, data processing unit and storage unit. The program of the invention includes a command to cause the information processing device:

to store in the storage unit a threshold value for evaluation of kidney condition inputted from the input unit, a calculation formula for D-serine excretion rate and/or a calculation formula for D-asparagine excretion rate in urine, and variables necessary for calculation, to store in the storage unit the D-serine level and/or D-asparagine level in a blood sample and/or urine sample and variables necessary for calculation of the D-serine excretion rate and/or D-asparagine excretion rate in urine, inputted from the input unit, to call the calculation formula for D-serine excretion rate and/or the calculation formula for D-asparagine excretion rate in urine that is prestored in the storage unit, and the D-serine level and/or D-asparagine level in a blood sample and/or urine sample and the variables, which are stored in the storage unit, and substitute them into the calculation formula for D-serine excretion rate and/or the calculation formula for D-asparagine excretion rate in urine to calculate the D-serine excretion rate and/or the D-asparagine excretion rate, in the data processing unit;

to compare the threshold stored in the storage unit and the D-serine excretion rate and/or the D-asparagine excretion rate in the data processing unit and evaluate kidney condition; and to output the evaluation results for kidney condition of the subject to the output unit. The program of the invention may be stored in a storage medium, or it may be provided via electronic transmission such as the interne or a LAN.

When the information processing device comprises an analytical measurement unit, it may include a command for causing the information processing device to take the value for the blood sample and/or urine sample measured by the analytical measurement unit and store it in the storage unit, instead of having the D-serine level and/or D-asparagine level values inputted from the input unit.

All of the publications mentioned throughout the present specification are incorporated herein in their entirety by reference.

The examples of the invention described below are intended to serve merely as illustration and do not limit the technical scope of the invention. The technical scope of the invention is limited solely by the description in the Claims. Modifications of the invention, such as additions, deletions or substitutions to the constituent features of the invention, are possible so long as the gist of the invention is maintained.

Example 1

Survey Population

A retrospective study was used for primary aldosteronism (PA), myeloma kidney (IGAN), diabetic nephropathy (DM) and IgA nephropathy (IGAN), from a cohort of kidney disease patients admitted to the Department of Nephrology, Osaka University Hospital for diagnosis and/or treatment from 2016 to 2017. Since IgA nephropathy test subjects had blood pressure above the reference range, they were given an angiotensin II receptor antagonist (ARB) as an antihypertensive drug. Separately, 15 healthy volunteers were recruited as non-kidney disease subjects by the National Institutes of Biomedical Innovation, Health and Nutrition. The test protocol was approved by the ethics committee of each facility, and written informed consent was obtained from all of the patients.

Measurement of D-Serine and D-Asparagine in Blood and Urine

Sample Preparation

Sample preparation from human blood plasma and urine was carried out as follows: First a 20-fold volume of methanol was added to and completely mixed with the blood plasma. After centrifugation, 10 µL of supernatant obtained from the methanol homogenate was transferred to a brown tube and dried under reduced pressure. To the residue there were added 20 µL of 200 mM sodium borate buffer (pH 8.0) and 5 µL of fluorescent labeling reagent (40 mM 4-fluoro-7-nitro-2,1,3-benzooxadiazole (NBD-F) in anhydrous MeCN), and the mixture was then heated at 60° C. for 2 minutes. The reaction was suspended by addition of 75 µL of aqueous 0.1% TFA (v/v), and 2 µL of the reaction mixture was supplied to two-dimensional HPLC.

Quantitation of Amino Acid Optical Isomers by Two-Dimensional HPLC

The amino acid optical isomers were quantified using the following two-dimensional HPLC system. NBD derivatives of the amino acids were separated and eluted using a reversed-phase column (KSAA RP, 1.0 mm i.d.×400 mm; Shiseido Corp.), in the mobile phase (5 to 35% MeCN, 0 to 20% THF, 0.05% TFA). The column temperature was 45° C. and the mobile phase flow rate was 25 µL/min. The separated amino acid fraction was separated off using a multi loop valve, and optically resolved in a continuous manner with a chiral column (KSAACSP-001S, 1.5 mm i.d.×250 mm; Shiseido Corp.). The mobile phase used was a MeOH/MeCN mixed solution containing citric acid (0 to 10 mM) or formic acid (0 to 4%), according to the amino acid retention. NBD-amino acids were detected by fluorescence detection at 530 nm using excitation light of 470 nm. The NBD-amino acid retention time was identified from standard amino acid optical isomers and quantified by a calibration curve.

Calculation of D-Serine Excretion Rate and D-Asparagine Excretion Rate

The blood urine D-serine level and blood urine D-asparagine level and creatinine level were calculated by substitution into the following formulas.

$$\text{D-serine excretion rate}(Fe\_D\text{-}Ser) = \frac{U_{D\text{-}Ser}/P_{D\text{-}Ser}}{U_{Cre}/P_{Cre}} \quad \text{[Mathematical Formula 11]}$$

[where
$U_{D\text{-}Ser}$ represents the level of D-serine in the urine,
$P_{D\text{-}Ser}$ represents the level of D-serine in the blood,
$U_{Cre}$ represents the level of creatinine in the urine, and
$P_{Cre}$ represents the level of creatinine in the blood]

$$\text{D-asparagine excretion rate}(Fe\_D\text{-}Asn) = \frac{U_{D\text{-}Asn}/P_{D\text{-}Asn}}{U_{Cre}/P_{Cre}} \quad \text{[Mathematical Formula 12]}$$

[where
$U_{D\text{-}Asn}$ represents the level of D-asparagine in the urine,
$P_{D\text{-}Asn}$ represents the level of D-asparagine in the blood,
$U_{Cre}$ represents the level of creatinine in the urine, and
$P_{Cre}$ represents the level of creatinine in the blood]

Evaluation and Assessment of Pathology

As mentioned above, the reference value for D-serine excretion rate in the non-kidney disease test subjects was calculated to be 42.46 to 89.66% as mean with ±1.96 standard deviation, and the logarithm was calculated to be 3.75 to 4.50. As also mentioned above, the reference value for D-asparagine excretion rate in the non-kidney disease test subjects was calculated to be 51.65 to 78.74% as mean with ±1.96 standard deviation, and the logarithm was calculated to be 3.95 to 4.37. The D-serine excretion rates for the kidney disease patients were a PA of 117.24%, which exceeded the reference range, IGAN of 64.56%, which was within the reference range, a DM of 42.58%, which was below the reference range (below the measured values for non-kidney disease test subjects) and an MGRS of 107.01%, which was above the reference range, and therefore pathology was clearly present with non-reference-range values (FIG. 2). The D-asparagine excretion rates for the kidney disease patients were a PA of 150.78%, which exceeded the reference range, IGAN of 45.71%, which was within the reference range, a DM of 53.75%, which was below the reference range (below the measured values for non-kidney disease test subjects) and an MGRS of 105.25%, which was above the reference range, and therefore pathology was clearly present with non-reference-range values (FIG. 2).

It will be a future requirement to increase pathology variation and the number of test subjects to improve analysis precision, but this test has confirmed the usefulness of the D-serine excretion rate and D-asparagine excretion rate in research for elucidating pathology mechanisms or for innovative drug development or treatment, in which the excretion rate exceeded 100% which is theoretically impossible without biosynthesis or secretion of D-serine and D-asparagine, and also for assisting clinical assessment of pathology and differential diagnosis. Equivalent results were also obtained using the logarithmic converted values.

Monitoring of Therapeutic Effect

The D-serine excretion rate for IGAN after administration of ARB due to hypertension fell from 64.56% to a value of 25.73%, which was below the reference value (FIG. 2). The D-asparagine excretion rate for IGAN after administration of ARB also fell from 45.71% to a value of 35.39%, which was below the reference value (FIG. 2). This suggests that excretion rate is affected by changes in the disease condition, such as lowered blood pressure, due to therapeutic intervention such as administration of a drug, and that D-serine excretion rate and D-asparagine excretion rate are useful for helping to determine policy such as continuation or suspension of treatment, in research conducted for the purpose of elucidating pharmacological mechanisms or for innovative drug development, and in the course of monitoring effects during therapeutic intervention.

Example 2

Test Subject Information

After obtaining written informed consent from a 36 year-old woman admitted to Osaka University Hospital with systemic lupus erythematosus, with ethical approval from the same University, their blood and urine were periodically sampled. The values rapidly worsened, with serum creatinine increasing from a level of 0.57 mg/dL 90 days before admission to 11.68 mg/dL and urine protein concentration increasing from 0.5 g/g Cre to 4.0 g/g Cre, while blood pressure was 122/65 mmHg, HR was 64 bpm, percutaneous arterial oxygen saturation was 100% (indoor air) and body temperature was 36.5° C. Mouth ulcers, alopecia and retinal hemorrhage were also noted, but no abnormal lung sounds, heart sounds or lower extremity edema was observed. Rapidly progressive glomerulonephritis was suspected in clinical testing, with blood hemoglobin of 4.6 g/dL, normal level complement of C3: 88 mg/dL and C4: 21 mg/dL, positive anti-dsDNA antibody of 13.0 IU/mL1, and P-ANCA of 182.0 U/mL, and therefore plasma exchange (PE) sessions were continued, and kidney biopsy was performed. Crescent-shaped cells were found in 79% of the glomeruli, fibrous crescent-shaped cells were found in 13%, and the glomerular capillaries were thickened with foam and spikes, although no glomerulosclerosis was observed. The interstitial regions showed moderate diffuse infiltration of inflammatory cells, but only slight fibrillation. Tubular atrophy was localized and moderate. In immunofluorescent staining, the granular glomerular capillary walls were positive overall for IgG, IgA, IgM, C3, C4 and C1q. Diagnosis was latent ANCA-related crescent-shaped glomerular nephritis, with lupus nephritis class V. Treatment was by prednisolone pulse therapy (3 days, 1 g), followed by oral prednisolone (40 mg/day), intermittent pulse intravenous cyclophosphamide therapy (500 mg/m$^2$) and mycophenolate mofetil (MMF, 500 mg/day). Eight series of plasma exchange was also carried out. In response to this treatment, the serum creatinine level fell to 0.72 mg/dL, but the urine protein level persisted. Follow-up kidney biopsy showed crescent retreat of glomerular cells, but with overall hardening of 30% of the glomeruli, and persistent thickening of the capillaries.

D-Serine Excretion Rate

The harvested blood and urine samples were prepared in the same manner as Example 1, and the D-serine was quantified while also calculating the D-serine excretion rate.

Pathology Evaluation and Assessment, and Monitoring of Therapeutic Effect

The D-serine excretion rate was 0 (below reference range) immediately after start of treatment, 0 (below reference range) after 8 days, 0 (below reference range) after 12 days, 0 (below reference range) after 16 days, 0 (below reference range) after 22 days, 58.9% (within reference range) after 29 days, 87.6% (above reference range) after 34 days, and 41.7% (within reference range) after 48 hours. While the creatinine level was still returning to the normal range by treatment, the D-serine excretion rate temporarily increased, fitting within the reference range calculated in Example 1.

During the course of treatment of nephropathy caused by systemic lupus erythematosus, a phenomenon of increased D-serine excretion rate was observed. This suggests that the kidneys control the excretion rate against risk or damage from some cause, as a biological defense response. It was thus confirmed that it is effective to monitor D-serine excretion rate in order to assist in research conducted for the purpose of elucidating pathology or pharmacological mechanisms, or innovative drug development and therapy, or clinical assessment of pathology and differential diagnosis, or determining treatment policy.

Example 3

A retrospective study was conducted with interstitial nephritis (TIN), prostatic hypertrophy (BPH), Fabry disease (Fabry) or microvariant nephrotic syndrome (MCNS) patients selected from a cohort consisting of kidney disease patients admitted to the Department of Nephrology, Osaka University Hospital from 2016 to 2017 for diagnosis and/or treatment. The test protocol was approved by the ethics committee of Osaka University, and written informed consent was obtained from all of the patients.

D-Serine Excretion Rate

The harvested blood and urine samples were prepared and quantified in the same manner as Example 1, and the D-serine excretion rates were calculated.

Evaluation, Assessment and Discrimination of Pathology

Figure 13:
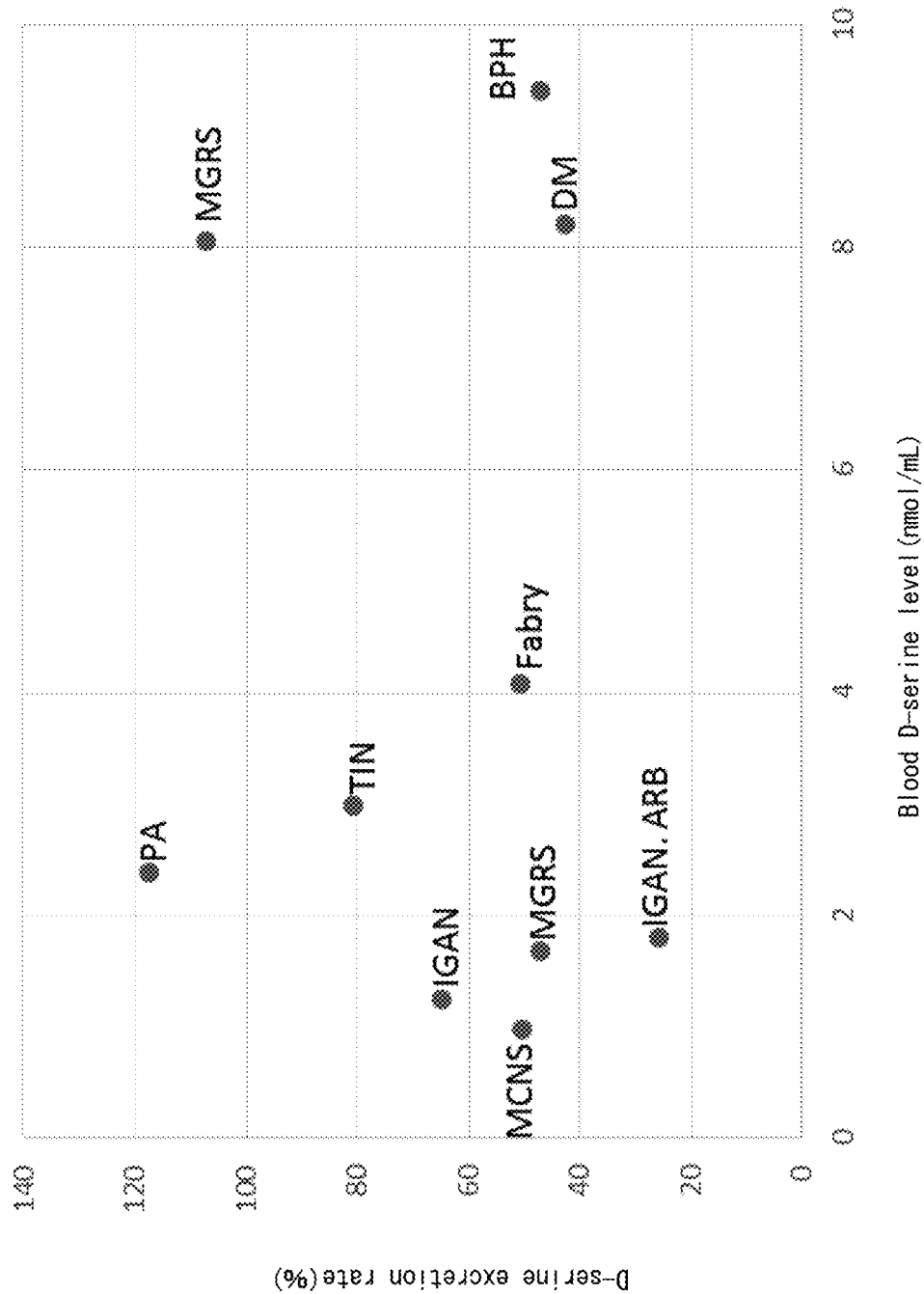
FIG. 13 is a plot diagram for blood D-serine level and D-serine excretion rate, measured for a patient diagnosed with kidney disease.

The blood D-serine levels and D-serine excretion rates of the patients were plotted on a two-axis coordinate system, together with the kidney disease patients of Example 1 (FIG. 13). The separative power of the plot was higher than the information for the blood D-serine levels and D-serine excretion rates for each pathology, indicating its usefulness for assisting in discrimination of cause and evaluation and assessment of disease condition.

The invention claimed is:

1. A method for assisting evaluation of kidney condition, using the rate of reabsorption and excretion of D-serine and/or D-asparagine in the kidneys of a subject as a marker: comprising: measuring a rate of reabsorption and excretion of D-serine and/or D-asparagine in the kidney by an enzyme method, chromatography or quantitation by an immunological method;
wherein the rate is the excretion rate of D-serine into urine of the subject (subject D-serine excretion rate) and/or the excretion rate of D-asparagine into urine of the subject (subject D-asparagine excretion rate);
and evaluating the kidney condition by comparing the measured rate of reabsorption and excretion of D-serine and/or D-asparagine to a threshold value.

2. The method according to claim 1, wherein the excretion rate of D-serine and/or the excretion rate of D-asparagine is calculated with correction using a correction factor from blood and/or urine.

3. The method according to claim 2, wherein the correction factor is one or more correction factors selected from the group consisting of glomerular filtration rate and urinary volume; or
wherein the correction factor is one or more correction factors selected from the group consisting of inulin clearance and creatinine clearance; or
wherein the correction factor is one or more correction factors selected from the group consisting of creatinine level and L-amino acid level; or
wherein the correction factor is L-serine and/or L-asparagine.

4. The method according to claim 1, wherein:
the excretion rate of D-serine is calculated by the following formula:

$$\text{D-serine excretion rate}(Fe\_D\text{-}Ser) = \frac{U_{D\text{-}Ser}/P_{D\text{-}Ser}}{U_{Cre}/P_{Cre}} = \frac{U_{D\text{-}Ser} \times V/P_{D\text{-}Ser}}{U_{Cre} \times V/P_{Cre}} = \frac{\text{D-serine clearance}}{\text{Creatinine clearance}}$$ [Mathematical Formula 1]

[where
$U_{D\text{-}Ser}$ represents the level of D-serine in the urine,
$P_{D\text{-}Ser}$ represents the level of D-serine in the blood,
$U_{Cre}$ represents the level of creatinine in the urine,
$P_{Cre}$ represents the level of creatinine in the blood and
V represents the Urine volume per time], and/or
the excretion rate of D-asparagine is calculated by the following formula:

$$\text{D-asparagine excretion rate}(Fe\_D\text{-}Asn) = \frac{U_{D\text{-}Asn}/P_{D\text{-}Asn}}{U_{Cre}/P_{Cre}} = \frac{U_{D\text{-}Asn} \times V/P_{D\text{-}Asn}}{U_{Cre} \times V/P_{Cre}} = \frac{\text{D-asparagine clearance}}{\text{Creatinine clearance}}$$ [Mathematical Formula 2]

[where
$U_{D\text{-}Asn}$ represents the level of D-asparagine in the urine,
$P_{D\text{-}Asn}$ represents the level of D-asparagine in the blood,
$U_{Cre}$ represents the level of creatinine in the urine,
$P_{Cre}$ represents the level of creatinine in the blood, and
V represents the Urine volume per time].

5. The method according to claim 1, wherein evaluating the kidney condition comprises comparing the subject D-serine excretion rate and/or the subject D-asparagine excretion rate with a first reference calculated from the excretion rates of D-serine into urine of multiple non-kidney disease subjects (non-kidney disease subject D-serine excretion rates) and/or the excretion rates of D-asparagine into urine of multiple non-kidney disease subjects (non-kidney disease subject D-asparagine excretion rates), and thereby evaluating kidney condition based on the relationship between the subject D-serine excretion rate and/or the subject D-asparagine excretion rate, and the first reference.

6. The method according to claim 5, wherein the evaluating kidney condition is evaluating kidney disease or morbidity risk of the subject or predicting occurrence or prognosis of kidney disease, when the subject D-serine excretion rate and/or the subject D-asparagine excretion rate are not within the range of the first reference.

7. The method according to claim 6, wherein the kidney disease is caused by chronic kidney disease, myeloma kidney, diabetic nephropathy, IgA nephropathy, interstitial nephritis or polycystic kidney, or systemic lupus erythematosus, primary aldosteronism, prostatic hypertrophy, Fabry disease or microvariant nephrotic syndrome.

8. The method according to claim 5, wherein the first reference is in the range of mean±SD×coefficient Z of the non-kidney disease subject D-serine excretion rate and/or non-kidney disease subject D-asparagine excretion rate.

9. The method according to claim 8, wherein the coefficient Z is a value of 1.0 to 3.0, or 1.96.

10. The method according to claim 9, wherein the first reference is in the range of 0.4 to 0.9.

11. The method according to claim 1, comprising:
comparing the logarithmic converted subject D-serine excretion rate (subject D-serine LN excretion rate) and/or the logarithmic converted subject D-asparagine excretion rate (subject D-asparagine LN excretion rate) with
a second reference calculated from the logarithmic converted values of the excretion rates of D-serine into urine of multiple non-kidney disease subjects (non-kidney disease subject D-serine LN excretion rates) and/or the logarithmic converted values of the excretion rates of D-asparagine into urine of multiple non-kidney disease subjects (non-kidney disease subject D-asparagine LN excretion rates), and
evaluating kidney condition based on the relationship between the subject D-serine LN excretion rate and/or the subject D-asparagine LN excretion rate, and the second reference.

12. The method according to claim 11, wherein the evaluating kidney condition is evaluating kidney disease or morbidity risk of the subject or predicting occurrence or prognosis of kidney disease, when the subject D-serine LN excretion rate and/or the subject D-asparagine LN excretion rate are not within the range of the second reference.

13. The method according to claim 12, wherein the kidney disease is caused by chronic kidney disease, myeloma kidney, diabetic nephropathy, IgA nephropathy, interstitial nephritis or polycystic kidney, or systemic lupus erythematosus, primary aldosteronism, prostatic hypertrophy, Fabry disease or microvariant nephrotic syndrome.

14. The method according to claim 11, wherein the second reference is in the range of mean±SD×coefficient Z of the non-kidney disease subject D-serine LN excretion rate and/or non-kidney disease subject D-asparagine LN excretion rate.

15. The method according to claim 14, wherein the coefficient Z is a value of 1.0 to 3.0, or 1.96.

16. The method according to claim 11, wherein the second reference is in the range of 3.5 to 5.0.

17. A system for evaluating kidney condition that comprises a storage unit, an input unit, an analytical measurement unit, a data processing unit and an output unit, wherein:
the storage unit configured to store a threshold value inputted from the input unit, and a calculation formula for D-serine excretion rate into urine and/or a calculation formula for D-asparagine excretion rate into urine,
the analytical measurement unit configured to quantify quantifies the D-serine level and/or D-asparagine level in a blood sample and/or urine sample by an enzyme method, a chromatography method or quantitation by an immunological method,
the data processing unit configured to calculate the D-serine excretion rate and/or D-asparagine excretion rate in urine generated from an element containing the quantified D-serine level and/or D-asparagine level in a blood sample and/or urine sample, and the calculation formula for D-serine excretion rate and/or the calculation formula for D-asparagine excretion rate stored in the storage unit, the data processing unit configured to evaluate kidney condition based on the threshold value stored in the storage unit and the D-serine excretion rate and/or D-asparagine excretion rate in the urine, and the output unit configured to output the evaluation results for kidney condition of the subject.

18. The evaluation system according to claim 17, wherein:
the calculation formula for D-serine excretion rate is the following formula:

$$\text{D-serine excretion rate}(Fe\_D\text{-}Ser) = \frac{U_{D\text{-}Ser}/P_{D\text{-}Ser}}{U_{Cre}/P_{Cre}} = \frac{U_{D\text{-}Ser} \times V/P_{D\text{-}Ser}}{U_{Cre} \times V/P_{Cre}} = \frac{\text{D-serine clearance}}{\text{Creatinine clearance}}$$ [Mathematical Formula 3]

[where
$U_{D\text{-}Ser}$ represents the level of D-serine in the urine,
$P_{D\text{-}Ser}$ represents the level of D-serine in the blood,
$U_{Cre}$ represents the level of creatinine in the urine,
$P_{Cre}$ represents the level of creatinine in the blood and
V represents the Urine volume per time], and/or
the calculation formula for D-asparagine excretion rate is the following formula:

$$\text{D-asparagine excretion rate}(Fe\_D\text{-}Asn) = \frac{U_{D\text{-}Asn}/P_{D\text{-}Asn}}{U_{Cre}/P_{Cre}} = \frac{U_{D\text{-}Asn} \times V/P_{D\text{-}Asn}}{U_{Cre} \times V/P_{Cre}} = \frac{\text{D-asparagine clearance}}{\text{Creatinine clearance}}$$ [Mathematical Formula 4]

[where
$U_{D\text{-}Asn}$ represents the level of D-asparagine in the urine,
$P_{D\text{-}Asn}$ represents the level of D-asparagine in the blood,
$U_{Cre}$ represents the level of creatinine in the urine,
$P_{Cre}$ represents the level of creatinine in the blood, and
V represents the Urine volume per time].

19. A program that causes an information processing device comprising an input unit, an output unit, a data processing unit and a storage unit to evaluate kidney condition, wherein the program includes a command programmed to cause the information processing device: to store in the storage unit a threshold value for evaluation of kidney condition inputted from the input unit, a calculation formula for a D-serine excretion rate and/or a calculation formula for a D-asparagine excretion rate in urine, and variables necessary for calculation, wherein the D-serine excretion rate and/or the D-asparagine excretion rate in urine is measured by an enzyme method, chromatography or quantitation by an immunological method, and stored in the storage unit as a D-serine level and/or a D-asparagine level in a blood sample and/or urine sample with variables necessary for calculation of the D-serine excretion rate and/or D-asparagine excretion rate in urine, inputted from the input unit, to call the calculation formula for D-serine excretion rate and/or the calculation formula for D-asparagine excretion rate in urine that is prestored in the storage unit, and the D-serine level and/or D-asparagine level in a blood sample and/or urine sample and the variables, which are stored in the storage unit, and substitute them into the calculation formula for D-serine excretion rate and/or the calculation formula for D-asparagine excretion rate in urine to calculate the D-serine excretion rate and/or the D-asparagine excretion rate, in the data processing unit; to compare the threshold stored in the storage unit and the D-serine excretion rate and/or the D-asparagine excretion rate in the data processing unit and evaluate kidney condition; and to output the evaluation results for kidney condition of the subject to the output unit.

20. The program according to claim 19, wherein:
the calculation formula for D-serine excretion rate is the following formula:

$$\text{D-serine excretion rate}(Fe\_D\text{-}Ser) = \quad [\text{Mathematical Formula 5}]$$

$$\frac{U_{D\text{-}Ser}/P_{D\text{-}Ser}}{U_{Cre}/P_{Cre}} = \frac{U_{D\text{-}Ser} \times V/P_{D\text{-}Ser}}{U_{Cre} \times V/P_{Cre}} = \frac{\text{D-serine clearance}}{\text{Creatinine clearance}}$$

[where
$U_{D\text{-}Ser}$ represents the level of D-serine in the urine,
$P_{D\text{-}Ser}$ represents the level of D-serine in the blood,
$U_{Cre}$ represents the level of creatinine in the urine,
$P_{Cre}$ represents the level of creatinine in the blood, and
V represents the Urine volume per time], and/or
the calculation formula for D-asparagine excretion rate is the following formula:

$$\text{D-asparagine excretion rate}(Fe\_D\text{-}Asn) = \quad [\text{Mathematical Formula 6}]$$

$$\frac{U_{D\text{-}Asn}/P_{D\text{-}Asn}}{U_{Cre}/P_{Cre}} = \frac{U_{D\text{-}Asn} \times V/P_{D\text{-}Asn}}{U_{Cre} \times V/P_{Cre}} = \frac{\text{D-asparagine clearance}}{\text{Creatinine clearance}}$$

[where
$U_{D\text{-}Asn}$ represents the level of D-asparagine in the urine,
$P_{D\text{-}Asn}$ represents the level of D-asparagine in the blood,
$U_{Cre}$ represents the level of creatinine in the urine,
$P_{Cre}$ represents the level of creatinine in the blood, and
V represents the Urine volume per time].

\* \* \* \* \*